United States Patent
Delvaux et al.

(10) Patent No.: US 10,822,955 B2
(45) Date of Patent: Nov. 3, 2020

(54) HYBRID ROTOR BLADES FOR TURBINE ENGINES

(71) Applicant: General Electric Company, Schenectady, NY (US)

(72) Inventors: John McConnell Delvaux, Fountain Inn, SC (US); Markus Feigl, Simpsonville, SC (US); Matthew Troy Hafner, Honea Path, SC (US); Michael Anthony Wondrasek, Greenville, SC (US); James Zhang, Simpsonville, SC (US); Peter de Diego, Zirconia, NC (US)

(73) Assignee: General Electric Company, Schenectady, NY (US)

( * ) Notice: Subject to any disclaimer, the term of this patent is extended or adjusted under 35 U.S.C. 154(b) by 167 days.

(21) Appl. No.: 16/235,114

(22) Filed: Dec. 28, 2018

(65) Prior Publication Data

US 2020/0208528 A1    Jul. 2, 2020

(51) Int. Cl.
*F01D 5/14*    (2006.01)
*F01D 5/28*    (2006.01)
*F01D 5/32*    (2006.01)
*F01D 5/30*    (2006.01)

(52) U.S. Cl.
CPC ............ *F01D 5/147* (2013.01); *F01D 5/14* (2013.01); *F01D 5/282* (2013.01); *F01D 5/3007* (2013.01); *F01D 5/323* (2013.01)

(58) Field of Classification Search
CPC . F01D 5/14; F01D 5/282; F01D 5/147; F01D 5/225; F05D 2260/96
See application file for complete search history.

(56) References Cited

U.S. PATENT DOCUMENTS

| | | | |
|---|---|---|---|
| 7,393,182 B2 | 7/2008 | Matheny | |
| 9,394,795 B1* | 7/2016 | Kimmel | ............... F01D 5/147 |
| 2007/0292274 A1 | 12/2007 | Burdgick et al. | |
| 2014/0255194 A1* | 9/2014 | Jones | ................ F01D 5/225 |
| | | | 416/212 A |
| 2015/0345296 A1* | 12/2015 | Davidson | ................ F01D 5/28 |
| | | | 60/805 |
| 2015/0369052 A1* | 12/2015 | de Diego | ............... F01D 5/282 |
| | | | 416/229 A |

* cited by examiner

*Primary Examiner* — Justin D Seabe
*Assistant Examiner* — Maxime M Adjagbe
(74) *Attorney, Agent, or Firm* — Charlotte C. Wilson; James W. Pemrick

(57) ABSTRACT

A gas turbine that includes a rotor blade that includes an airfoil. The airfoil may include non-integral base and top portions. The airfoil may include a pin connector connecting the top portion to the base portion. The pin connector may include: a tab extending from the top portion; a complimentary slot for receiving the tab formed in the base portion; an elongated pin cavity formed through an interior region of the airfoil, where the pin cavity intersects the slot to divide the pin cavity into first and second pin cavity segments; a tab aperture formed through the tab, where the tab aperture is positioned so align with the pin cavity upon the tab being received within the slot; and a locking pin that extends continuously through the first segment of the pin cavity, the tab aperture, and the second segment of the pin cavity.

20 Claims, 14 Drawing Sheets

HYBRID ROTOR BLADES FOR TURBINE ENGINES

BACKGROUND OF THE INVENTION

This present application relates to rotor blades in gas turbine engines. More specifically, but not by way of limitation, the present application relates to the design and manufacture of rotor blades having hybrid airfoils for use in turbine engines.

Generally, combustion or gas turbine engines (hereinafter "gas turbines") include compressor and turbine sections in which rows of blades are axially stacked in stages. Each stage typically includes a row of circumferentially-spaced stator blades, which are fixed, and a row of rotor blades, which rotate about a central turbine axis or shaft. In operation, generally, the compressor rotor blades are rotated about the shaft, and, acting in concert with the stator blades, compress a flow of air. This supply of compressed air then is used within a combustor to combust a supply of fuel. The resulting flow of hot expanding combustion gases, which is often referred to as working fluid, is then expanded through the turbine section of the engine. Within the turbine, the working fluid is redirected by the stator blades onto the rotor blades so to power rotation. The rotor blades are connected to a central shaft such that the rotation of the rotor blades rotates the shaft. In this manner, the energy contained in the fuel is converted into the mechanical energy of the rotating shaft, which, for example, may be used to rotate the rotor blades of the compressor, so to produce the supply of compressed air needed for combustion, as well as, for example, rotate the coils of a generator so to generate electrical power. During operation, because of the temperatures of the hot-gas path, the velocity of the working fluid, and the rotational velocity of the engine, the rotor blades within the turbine become particularly stressed with extreme mechanical and thermal loads.

Many industrial applications, such as those involving power generation and aviation, still rely heavily on gas turbines, and because of this, the engineering of more efficient engines remains an important objective. Even incremental advances in machine performance, efficiency, or cost-effectiveness provide a significant edge in the increasingly competitive markets affected by this technology. While there are several known strategies for improving the efficiency of gas turbines—such as, for example, increasing the size of the engine, increasing the temperatures through the hot-gas path, or increasing the rotational velocities of the rotor blades—each of these generally places additional strain on the blades and other hot-gas path components, which are already nearing the limits of conventional designs. As a result, there remains a need for improved apparatus, methods, and/or systems capable of alleviating such operational stresses or, alternatively, enhancing the durability of the components to better withstand them. This need is particularly evident in regard to turbine rotor blades, where marketplace competitiveness is exceedingly high and the many design considerations are interrelated and complex. As such, novel rotor blade designs, such as those presented herein, that balance these considerations in ways that optimize or enhance one or more desired performance criteria—while still adequately promoting structural robustness, part-life longevity, cost-effective engine operation, and/or efficient usage of coolant—represent technological advances of considerable value.

BRIEF DESCRIPTION OF THE INVENTION

The present application thus describes a gas turbine that includes a rotor blade that includes an airfoil. The airfoil may include non-integral portions in which: a base portion of the airfoil is made from a first material; and a top portion of the airfoil is made from a second material. The airfoil may include a pin connector connecting the top portion to the base portion. The pin connector may include: a tab extending from one of the base portion and the top portion; a complimentary slot for receiving the tab, where the slot is formed in the other one of the base portion and the top portion; an elongated pin cavity formed through an interior region of the airfoil that is adjacent to the slot, where the pin cavity intersects the slot so that the pin cavity is divided into first and second pin cavity segments that extend away from the slot from first and second openings defined on opposing first and second sidewalls of the slot, respectively; a tab aperture formed through the tab, where the tab aperture is positioned so align with the pin cavity upon the tab being received within the slot; and a locking pin that extends continuously through the first segment of the pin cavity, the tab aperture, and the second segment of the pin cavity.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
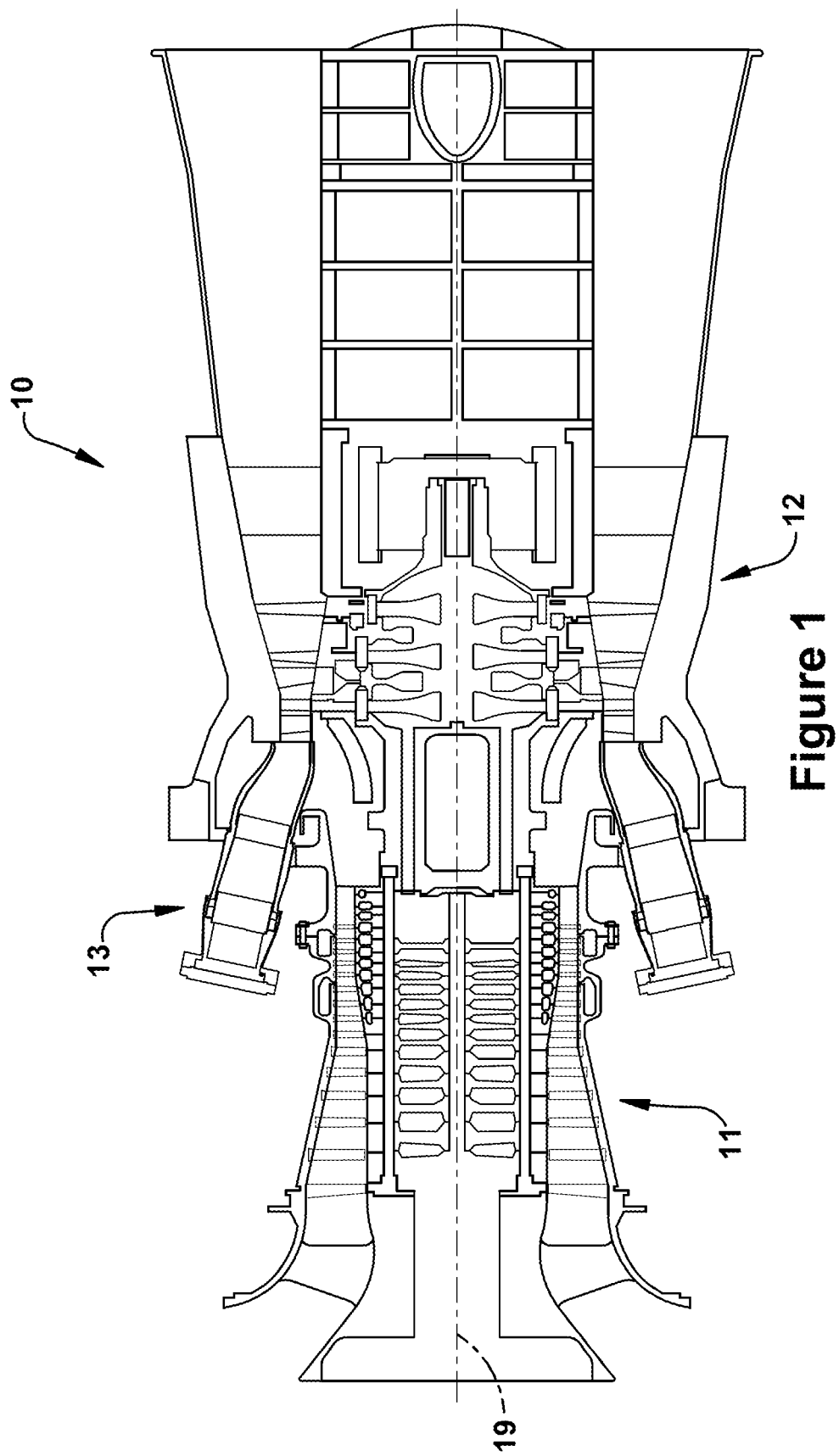
FIG. 1 is a schematic representation of an exemplary gas turbine that may include turbine blades according to possible aspects and embodiments of the present application.

Aspects and advantages of the present application are set forth below in the following description, or may be obvious from the description, or may be learned through practice of the disclosure. Reference will now be made in detail to present embodiments of the disclosure, one or more examples of which are illustrated in the accompanying drawings. The detailed description uses numerical designations to refer to features in the drawings. Like or similar designations in the drawings and description may be used to refer to like or similar parts of embodiments of the disclosure. As will be appreciated, each example is provided by way of explanation, not limitation of the disclosure. In fact, it will be apparent to those skilled in the art that modifications and variations can be made in the present disclosure without departing from the scope or spirit thereof. For instance, features illustrated or described as part of one embodiment may be used on another embodiment to yield a still further embodiment. It is intended that the present disclosure covers such modifications and variations as come within the scope of the appended claims and their equivalents. It is to be understood that the ranges and limits mentioned herein include all sub-ranges located within the prescribed limits, inclusive of the limits themselves unless otherwise stated. Additionally, certain terms have been selected to describe the present invention and its component subsystems and parts. To the extent possible, these terms have been chosen based on terminology common to the technology field. Still, it will be appreciated that such terms often are subject to differing interpretations. For example, what may be referred to herein as a single component, may be referenced elsewhere as consisting of multiple components, or, what may be referenced herein as including multiple components, may be referred to elsewhere as being a single component. Thus, in understanding the scope of the present disclosure, attention should not only be paid to the particular terminology used, but also to the accompanying description and context, as well as the structure, configuration, function, and/or usage of the component being referenced and described, including the manner in which the term relates to the several figures, as well as, of course, the usage of the terminology in the appended claims. The following examples are presented in relation to particular types of turbine engines. However, it should be understood that the technology of the present application may be applicable to other categories of turbine engines, without limitation, as would be appreciated by a person of ordinary skill in the relevant technological arts. Accordingly, unless otherwise stated, the usage herein of the term "turbine engine" is intended broadly and without limiting the usage of the claimed invention with different types of turbine engines, including various types of combustion or gas turbine engines as well as steam turbine engines.

Given the nature of how turbine engines operate, several terms may prove particularly useful in describing certain aspects of their function. For example, the terms "downstream" and "upstream" are used herein to indicate position within a specified conduit or flowpath relative to the direction of flow or "flow direction" of a fluid moving through it. Thus, the term "downstream" refers to the direction in which a fluid is flowing through the specified conduit, while "upstream" refers to the direction opposite that. These terms should be construed as referring to the flow direction through the conduit given normal or anticipated operation. Given the configuration of turbine engines, particularly the arrangement of the components about a common or central shaft or axis, terms describing position relative to an axis may be used regularly. In this regard, it will be appreciated that the term "radial" refers to movement or position perpendicular to an axis. Related to this, it may be required to describe relative distance from the central axis. In such cases, for example, if a first component resides closer to the central axis than a second component, the first component will be described as being either "radially inward" or "inboard" of the second component. If, on the other hand, the first component resides further from the central axis than the second, the first component will be described as being either "radially outward" or "outboard" of the second component. As used herein, the term "axial" refers to movement or position parallel to an axis, while the term "circumferential" refers to movement or position around an axis. Unless otherwise stated or made plainly apparent by context, these terms should be construed as relating to the central axis of the turbine as defined by the shaft extending therethrough, even when these terms are describing or claiming attributes of non-integral components—such as rotor or stator blades—that function therein. Finally, the term "rotor blade" is a reference to the blades that rotate about the central axis of the turbine engine during operation, while the term "stator blade" is a reference to the blades that remain stationary.

Figure 2:
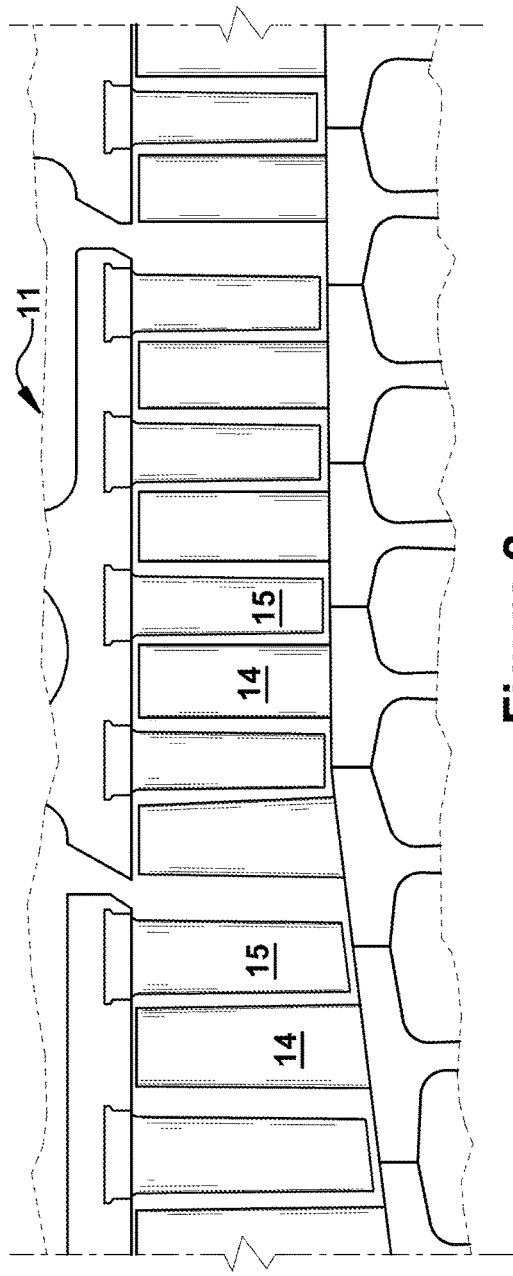
FIG. 2 is a sectional view of the compressor section of the gas turbine of FIG. 1.
Figure 3:
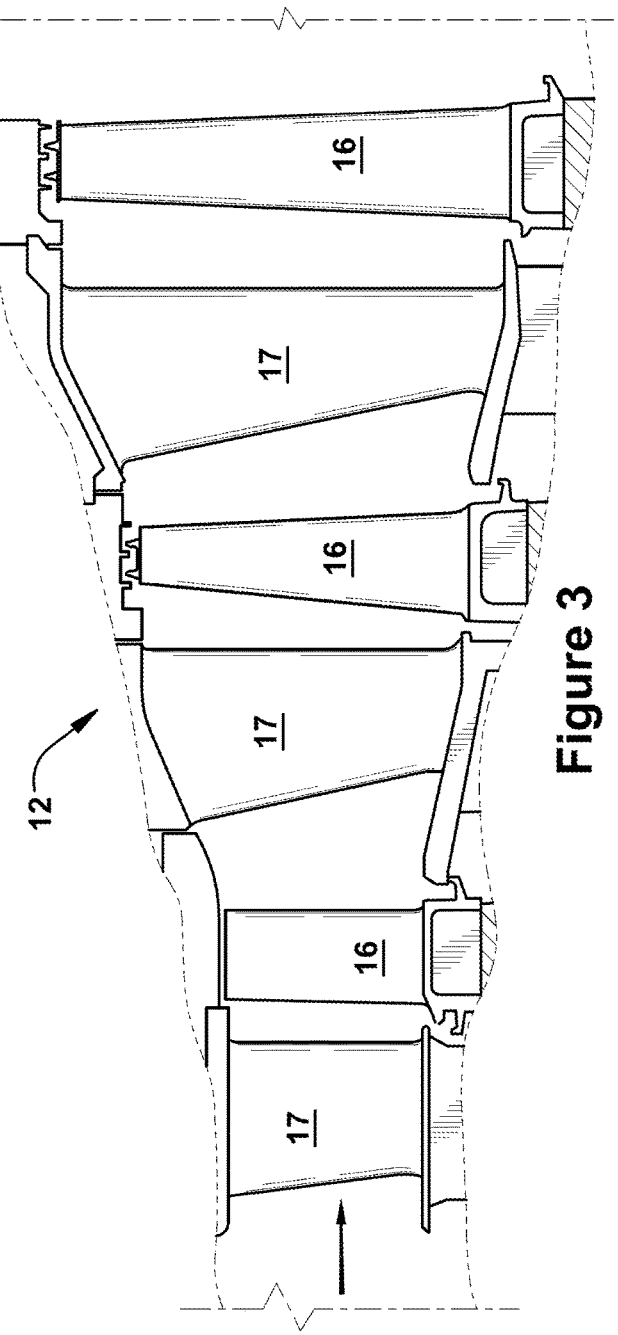
FIG. 3 is a sectional view of the turbine section of the gas turbine of FIG. 1.

By way of background, referring now with specificity to the figures, FIGS. 1 through 3 illustrate an exemplary gas turbine engine (or "gas turbine") in accordance with the present invention or within which the present invention may be used. As illustrated in FIG. 1, a gas turbine 10 includes an upstream compressor section (or "compressor") 11 that is mechanically coupled by a common shaft or rotor to a downstream turbine section (or "turbine") 12. A combustor 13 is positioned between the compressor 11 and the turbine 12. The gas turbine 10 is formed about a common central axis 19.

FIG. 2 shows an exemplary multi-staged axial compressor 11 that may be used in the gas turbine of FIG. 1. As shown, the compressor 11 may have a plurality of stages, each of which include a row of compressor rotor blades 14 and a row of compressor stator blades 15. Thus, a first stage may include a row of compressor rotor blades 14, which rotate about a central shaft, followed by a row of compressor stator blades 15, which remain stationary during operation.

FIG. 3 illustrates a partial view of an exemplary turbine section or turbine 12 that may be used in the gas turbine of FIG. 1. The turbine 12 also may include a plurality of stages. Three exemplary stages are illustrated, but more or less may be present. Each stage may include a plurality of turbine nozzles or stator blades 17, which remain stationary during operation, followed by a plurality of turbine buckets or rotor blades 16, which rotate about the shaft during operation. The turbine stator blades 17 generally are circumferentially spaced one from the other and fixed about the axis of rotation to an outer casing. The turbine rotor blades 16 may be mounted on a turbine wheel or rotor disc (not shown) for rotation about a central axis. It will be appreciated that the turbine stator blades 17 and turbine rotor blades 16 lie in the hot gas path or working fluid flowpath through the turbine 12. The direction of flow of the combustion gases or working fluid within the working fluid flowpath is indicated by the arrow.

In one example of operation for the gas turbine 10, the rotation of compressor rotor blades 14 within the axial compressor 11 may compress a flow of air. In the combustor 13, energy may be released when the compressed air is mixed with a fuel and ignited. The resulting flow of hot gases or working fluid from the combustor 13 is then directed over the turbine rotor blades 16, which induces the rotation of the turbine rotor blades 16 about the shaft. In this way, the energy of the flow of working fluid is transformed into the mechanical energy of the rotating blades and, given the connection between the rotor blades and the shaft, the rotating shaft. The mechanical energy of the shaft may then be used to drive the rotation of the compressor rotor blades 14, such that the necessary supply of compressed air is produced, and also, for example, a generator to produce electricity.

FIGS. 4 through 7 provide views of a turbine rotor blade 16 in accordance with or within which aspects of the present invention may be practiced. As will be appreciated, these figures are provided to illustrate common configurations of rotor blades and delineate spatial relationships between components and regions within such blades for later reference, while also describing geometric constraints and other criteria that affect the internal and external design thereof. While the blade of this example is a rotor blade, it will be appreciated that, unless otherwise stated, the present invention also may be applied to other types of blades within the gas turbine. As stated above, description of such components may include terminology that derives meaning based on the orientation and function of the gas turbine engine and, more specifically, the orientation and function within working fluid flowpath. Thus, for example, where contextually applicable, description related to the rotor blade may be understood assuming the rotor blade is properly installed and functioning within the engine under anticipated or normal operating conditions.

The rotor blade 16, as illustrated, may include a root 21 that is configured for attaching to a rotor disc. The root 21, for example, may include a connector 22 configured for mounting in a corresponding dovetail slot in the perimeter of a rotor disc. The root 21 may further include a shank 23 that extends between the connector 22 and a platform 24. The platform 24, as shown, generally forms the junction between the root 21 and an airfoil 25, with the airfoil 25 being the active component of the rotor blade 16 that intercepts the flow of working fluid through the turbine 12 and induces the desired rotation. The platform 24, thus, may define the inboard end of the airfoil 25. The platform also may define a section of the inboard boundary of the working fluid flowpath through the turbine 12.

Figure 7:
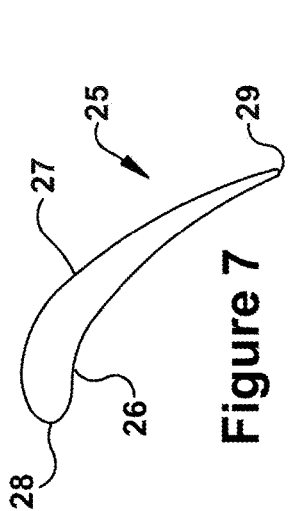
FIG. 7 is a section view along sight line 7-7 of FIG. 4.
Figure 6:
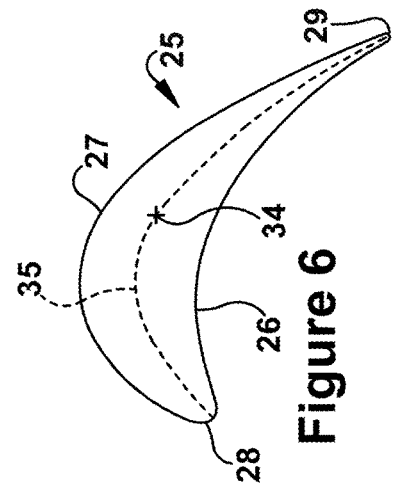
FIG. 6 is a section view along sight line 6-6 of FIG. 4.
Figure 5:
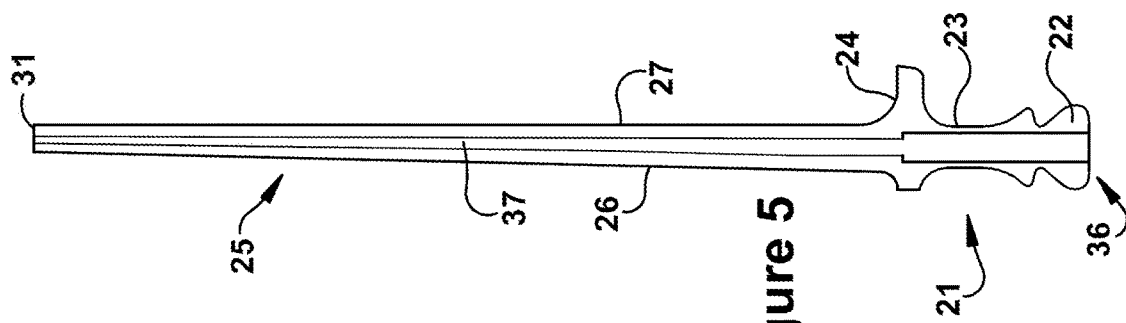
FIG. 5 is a section view along sight line 5-5 of FIG. 4.
Figure 4:
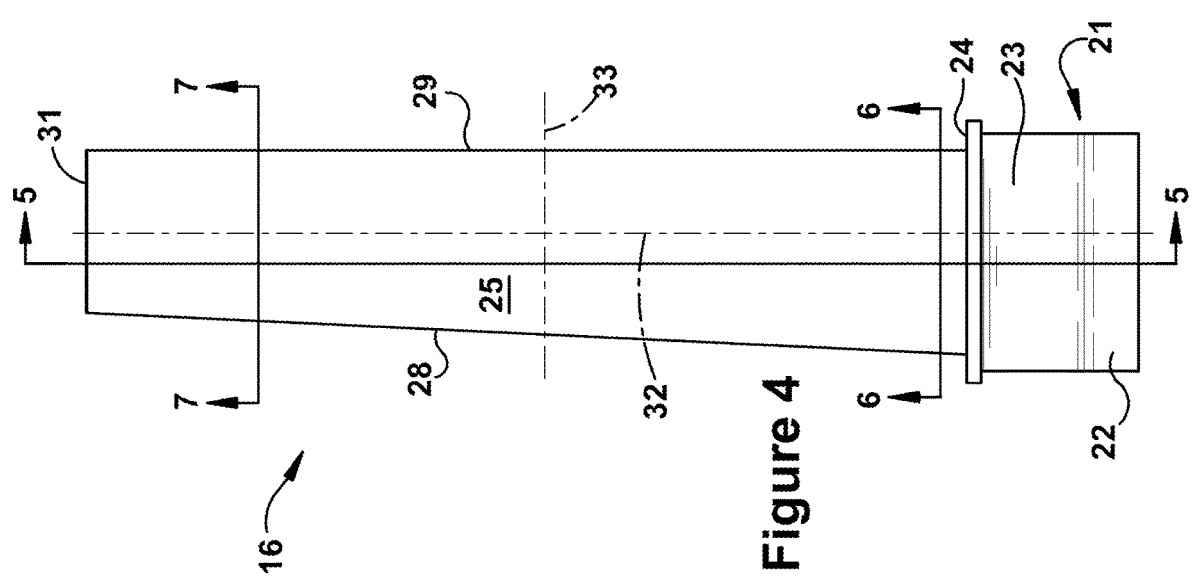
FIG. 4 is a side view of an exemplary turbine rotor blade that includes an internal cooling configuration and structural arrangement according to possible aspects and embodiments of the present application.

The airfoil 25 of the rotor blade may typically include a concave pressure face 26 and a circumferentially or laterally opposite convex suction face 27. The pressure face 26 and suction face 27 may extend axially between opposite leading and trailing edges 28, 29, respectively, and, in the radial direction, between an inboard end, which may be defined at the junction with the platform 24, and an outboard tip 31. The airfoil 25 may include a curved or contoured shape that is designed for promoting desired aerodynamic performance. As illustrated in FIGS. 4 and 5, the shape of the airfoil 25 may taper gradually as it extends between the platform 24 and the outboard tip 31. The tapering may include an axial tapering that narrows the distance between the leading edge 28 and the trailing edge 29 of the airfoil 25, as illustrated in FIG. 4, as well as a circumferential tapering that reduces the thickness of the airfoil 25 as defined between the suction face 26 and the pressure face 27, as illustrated in FIG. 5. As shown in FIGS. 6 and 7, the contoured shape of the airfoil 25 may further include a twisting about the longitudinal axis of the airfoil 25 as it extends from the platform 24. As will be appreciated, the twisting may be included so to vary a stagger angle for the airfoil 25 gradually between the inboard end and outboard tip 31.

For descriptive purposes, as shown in FIG. 4, the airfoil 25 of the rotor blade 16 may further be described as including a leading edge section or half and trailing edge section or half defined to each side of an axial midline 32. The axial midline 32, according to its usage herein, may be formed by connecting the midpoints 34 of the camber lines 35 of the airfoil 25 between the platform 24 and the outboard tip 31. Additionally, the airfoil 25 may be described as including two radially stacked sections defined inboard and outboard of a radial midline 33 of the airfoil 25. Thus, as used herein, an inboard section or half of the airfoil 25 extends between the platform 24 and the radial midline 33, while an outboard section or half extends between the radial midline 33 and the outboard tip 31. Finally, the airfoil 25 may be described as including a pressure face section or half and a suction face section or half, which, as will be appreciated are defined to each side of the camber line 35 of the airfoil 25 and the corresponding face 26, 27 of the airfoil 25.

The rotor blade 16 may further include an internal cooling configuration 36 having one or more cooling channels 37 through which a coolant is circulated during operation. Such cooling channels 37 may extend radially outward from a connection to a supply source formed through the root 21 of the rotor blade 16. The cooling channels 37 may be linear, curved or a combination thereof, and may include one or more outlet or surface ports through which coolant is exhausted from the rotor blade 16 and into the working fluid flowpath.

Figure 8:
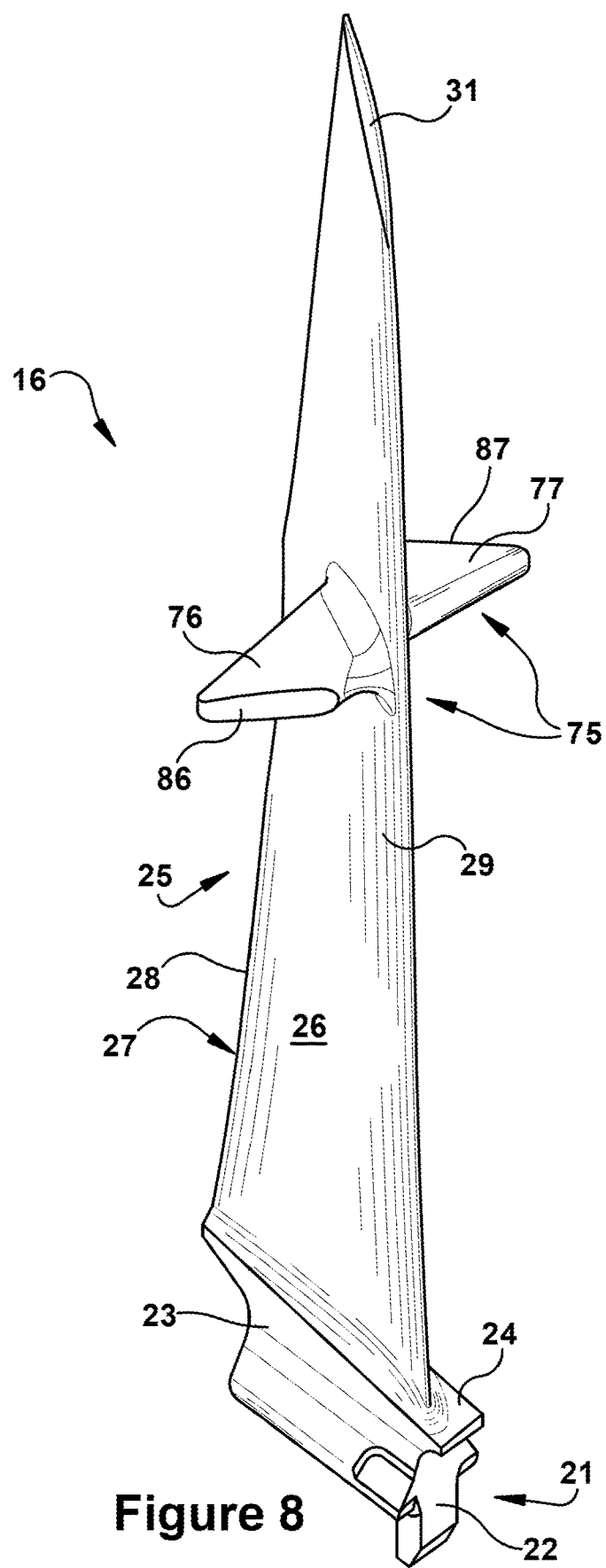
FIG. 8 is a perspective view of an exemplary turbine rotor blade having a part-span shroud that includes configuration according to possible aspects and embodiments of the present application.

FIG. 8 provides views of an exemplary turbine rotor blade having a midspan or part-span shroud in accordance with the present invention or within which aspects of the present invention may be practiced. Specifically, a perspective view is provided of a rotor blade 16 in which the airfoil 25 includes an exemplary part-span shroud 75. In general, the part-span shroud 75 is configured to span between neighboring airfoils within a row of installed rotor blades 16. Part-span shrouds are generally positioned to coincide radially with the middle region of the airfoil 25. Accordingly, part-span shrouds 75 may be positioned near the radial midline 33 of the airfoil 25, as shown in FIG. 4. According to a definition used herein, part-span shrouds 75 may be defined broadly as a shroud positioned inboard of an outboard tip 31 of the airfoil 25 and outboard of a platform 24. According to another definition used herein, a part-span shroud 75 also may be defined as one disposed within a radial range of the airfoil 25. Thus, according to certain embodiments, this radial range of may be defined as being between an inboard boundary of approximately 25% of the radial height of the airfoil 25 and an outboard boundary of approximately 85% of the radial height of the airfoil 25. According to other more specific embodiments, the range of positions of a part-span shroud 75 is defined as being between an inboard boundary of approximately 33% of the radial height of the airfoil 25 and an outboard boundary of approximately 66% of the radial height of the airfoil 25.

The part-span shroud 75 may include wing-like projections extending from the sides of the airfoil 25. Each of these wing-like projections may be referred to according to the face 26, 27 of the airfoil 25 from which it extends. Thus, for descriptive purposes herein, the part-span shroud 75 is reference as including a pressure wing 76 that juts from the pressure face 26 of the airfoil 25, and a suction wing 77 that juts from the suction face 27 of the airfoil 25. As illustrated, each of the wings 76, 77 may be configured as an axially and circumferentially jutting component that is comparatively thin in the radial dimension compared to the radial height of the airfoil 25. Each of the wings 76, 77 of the part-span shroud 75 may be configured to functionally cooperate with the opposite one of the wings 76, 77 of a neighboring rotor blade positioned next to it within the blade row. Specifically, the pressure wing 76 that extends from the pressure face 26 of a first rotor blade 16 may be configured to cooperate with the suction wing 77 that extends from the suction face 27 of a second rotor blade 16 that resides to one side of the first rotor blade 16. Similarly, the suction wing 77 that extends from the suction face 27 of the first rotor blade 16 may be configured to cooperate with the pressure wing 76 that extends from the pressure face 26 of a third rotor blade 16 that resides to the other side of the first rotor blade 16. In this manner, the part-span shrouds 75 may be used to create a point of contact between the airfoils 25 of adjacent rotor blades 16 during operation. This contact may be intermittent or constant and may depend upon an operating mode of the gas turbine. As will be appreciated, the linking of the airfoils 25 of rotor blades 16 in this manner may be done to increase the natural frequency of the assembly and dampen operational vibrations, which may reduce the overall mechanical stresses on the rotor blades 16 and prolong useful life. As used herein, a distal end of the pressure wing is designed as a pressure wing circumferential face 86, and a distal end of the suction wing is designated as a suction wing circumferential face 87.

Turning now to exemplary embodiments of the present disclosure, FIGS. 9 through 18 present turbine rotor blades that have a hybrid airfoil design in which a top portion of the airfoil is made from a different material than a base portion of the airfoil. In preferred embodiments, the top portion is made from a lighter material, such as a composite material, while the base portion remains a heavier material, such as a metal. As will be appreciated, most conventional rotor blades are made entirely of metal, and, because of the resulting weight, require significant cooling air and robust root structure to satisfy component life requirements. By replacing the top portion of the airfoil with a lighter material in the ways suggested herein, the centrifugal pull load on the rotor blade can be reduced significantly. This reduction can be used to lengthen the life of the rotor blade, reduce reliance on cooling air, and/or enable higher firing temperatures, all of which may facilitate higher output and efficiency in gas turbines. In addition, as will be seen, the present hybrid airfoil configurations allow for a simplified geometry for the top portion, which can greatly simplify the overall manufacturing process, particularly compared to the making the entire rotor blade out of the composite material. In this way, the more complicated geometry of the base portion and root of the rotor blade can be constructed out of metal via conventional processes, e.g., one-piece casting, while, in accordance with the present disclosure, the simplified geometry of the top portion allows for efficient construction with composite materials and the conventional manufacturing processes associated therewith.

Pursuant to the present disclosure, the composite top portion of the airfoil—which, as will be seen, may be constructed as a solid piece or hollowed to reduce weight even further—is secured to the metal base portion of the blade via a connector. In accordance with the exemplary embodiments presented below, this connector may take several different forms, each of which has been found to effectively connect the different material types of the top and base airfoil portions in ways that promote a robust structure, improve stress spreading characteristics, and extend component life, while also being cost-effective to manufacture. In accordance with an exemplary embodiment—with reference to FIGS. 9 through 11—the connector includes a dovetail joint that creates an interlocking fit between the base and top airfoil portions. Alternative embodiments within this example include dovetail joints that are engaged axially or circumferentially. In accordance with another embodiment—with reference to FIGS. 12 through 14—the connector includes what will be referred to herein as a "wire-lock" to secure the top to the base portion of the airfoil. Finally—with reference to FIGS. 15 through 18—the connector includes a pin connector in which one or more pins secure the top to the base portion of the airfoil. As discussed below, alternatives within this type of configuration include single or double pin arrangements.

Further, in accordance with exemplary embodiments, the hybrid airfoil may include a part-span shroud that is positioned near or adjacent to the dividing or interface line that separates the two airfoil portions. The incorporation of a part-span shroud into hybrid airfoil designs has been found to provide several advantages. For example, because part-span shrouds provide points of contact between neighboring airfoils, their use with hybrid airfoils can be leveraged to provide additional support at critical locations at or very near the interface of the different materials, which may alleviate particular stress concentrations occurring at the joint and extend useful life. Along with supporting the airfoil, part-span shrouds also can be used to reduce vibrations that otherwise could prematurely wear the connectors of hybrid airfoils. Another benefit of using part-span shrouds includes the spatial advantage they provide to hybrid airfoil connectors. As will be seen—particularly with regard to the pin connectors—certain features of the connectors can be integrated into the additional space provided by the part-span shrouds without degrading their function or performance.

A few general characteristics and features regarding the hybrid airfoils of the present disclosure will now be discussed. Unless otherwise stated, it is intended that each of these are applicable to each of the embodiments illustrated in FIGS. 9 through 18 and discussed below. Additionally, in understanding the present disclosure, it should be appreciated that when rotor blades and airfoil components are described in relation to directional or orientation characteristics, these relate to the turbine engine in which the components are used. Thus, unless otherwise stated, this type of description assumes that the component is properly installed and functioning within the turbine engine, e.g., gas turbine. As used herein, such gas turbine orientation characteristics may include relative radial, axial, and circumferential positioning defined in relation to the central axis of the gas turbine that extends through the compressor and turbine. Also, a forward direction and an aftward direction are defined relative to the compressor being positioned at the forward end of the gas turbine and the turbine being positioned at the aftward end of the gas turbine.

First, with general reference to exemplary embodiments of FIGS. 9 through 18, the airfoil 25 may be an airfoil or blade used in a turbine engine. More specifically, the airfoil 25 may be an airfoil of a rotor blade 16, for example, a turbine rotor blade, in a gas turbine. As already discussed, the airfoil 25 may generally extend between a connection with a root 21 of the rotor blade and an outboard tip 31 of the airfoil 25.

As will be seen, the airfoil 25 may be a hybrid airfoil, which is formed by connecting non-integral portions of the airfoil. As used herein, the non-integral portions include a base portion 101 and a top portion 102. Each of the base portion 101 and the top portion 102 may be defined as a radial section of the airfoil 25. Along the surface of the airfoil 25, the base portion 101 and the top portion 102 may abut or join along an interface line 106 (shown in FIGS. 11 and 16). The base portion 101 of the airfoil 25 may include an outboard face 107, which, as will be appreciated, is the face that abuts the top portion 102 upon assembly therewith. The base portion 101, thus, may be described as the radial section of the airfoil 25 that extends between the connection that the airfoil 25 makes with the root 21 and the outboard face 107. The top portion 102 of the airfoil 25 may include an inboard face 108, which, as will be appreciated, is the face that abuts the base portion 101 upon assembly therewith. The top portion 102, thus, may be described as the radial section of the airfoil 25 extending between the outboard tip 31 and the inboard face 108. As will be appreciated, the periphery of the outboard face 107 of the base portion 101 and the periphery of the inboard face 108 of the top portion 102 abut to form the interface line 106.

Second, with continued reference generally to FIGS. 9 through 18, the base portion 101 and top portion 102 may be configured so that the interface line 106 occurs near or within the middle portion of the airfoil 25. For example, according to exemplary embodiments the radial height of the top portion 102 is between 25% and 55% of the radial height of the airfoil 25 (i.e., the height of both the base portion 101 and the top portion 102). Further, when the airfoil 25 includes a part-span shroud 75, the airfoil 25 may be configured so that interface line 106 is positioned near or adjacent to the part-span shroud 75. In accordance with preferred embodiments, for example, the base portion 101 and top portion 102 of the airfoil 25 are configured such that the interface line 106 is positioned outboard of the part-span shroud 75 as well as near or adjacent to it.

Third, with continued reference generally to FIGS. 9 through 18, the top portion 102 of the airfoil 25 may include a hollow chamber or pocket 109. For example, according to a preferred embodiment, the hollow pocket 109 may extend into the top portion 102 from an opening 110 formed through the outboard tip 31 of the airfoil 25. In accordance with the present disclosure, one reason for the hollow pocket 109 is to remove weight from the top portion 102 of the airfoil 25. Thus, the hollow pocket 109 may be configured to have a significant volume relative to the volume of the top portion 102. In accordance with exemplary embodiments, for example, the hollow pocket 109 has a volume that is greater than ¼ of the volume of the top portion 102.

Finally, with continued reference generally to FIGS. 9 through 18, in accordance with exemplary embodiments, the base portion 101 and the top portion 102 of the airfoil 25 are made from different materials. That is, the airfoil 25 may be constructed by connecting non-integral portions in which: the base portion 101 is made from a first material; and the top portion 102 is made from a second material. In general, the material chosen for the base portion 101 is a heavier material than the one chosen for the top portion 102. As already discussed, one reason for this configuration is to remove weight from the outer radial portion of the airfoil 25 and, thereby, significantly reduce pull loads during operation. In accordance with exemplary embodiments, the first material of the base portion 101 is a metal, for example, a steel or nickel alloy. In accordance with exemplary embodiments, the second material of the top portion 102 is a composite material, for example, a ceramic matrix composite. Other materials are also possible.

Figure 9:
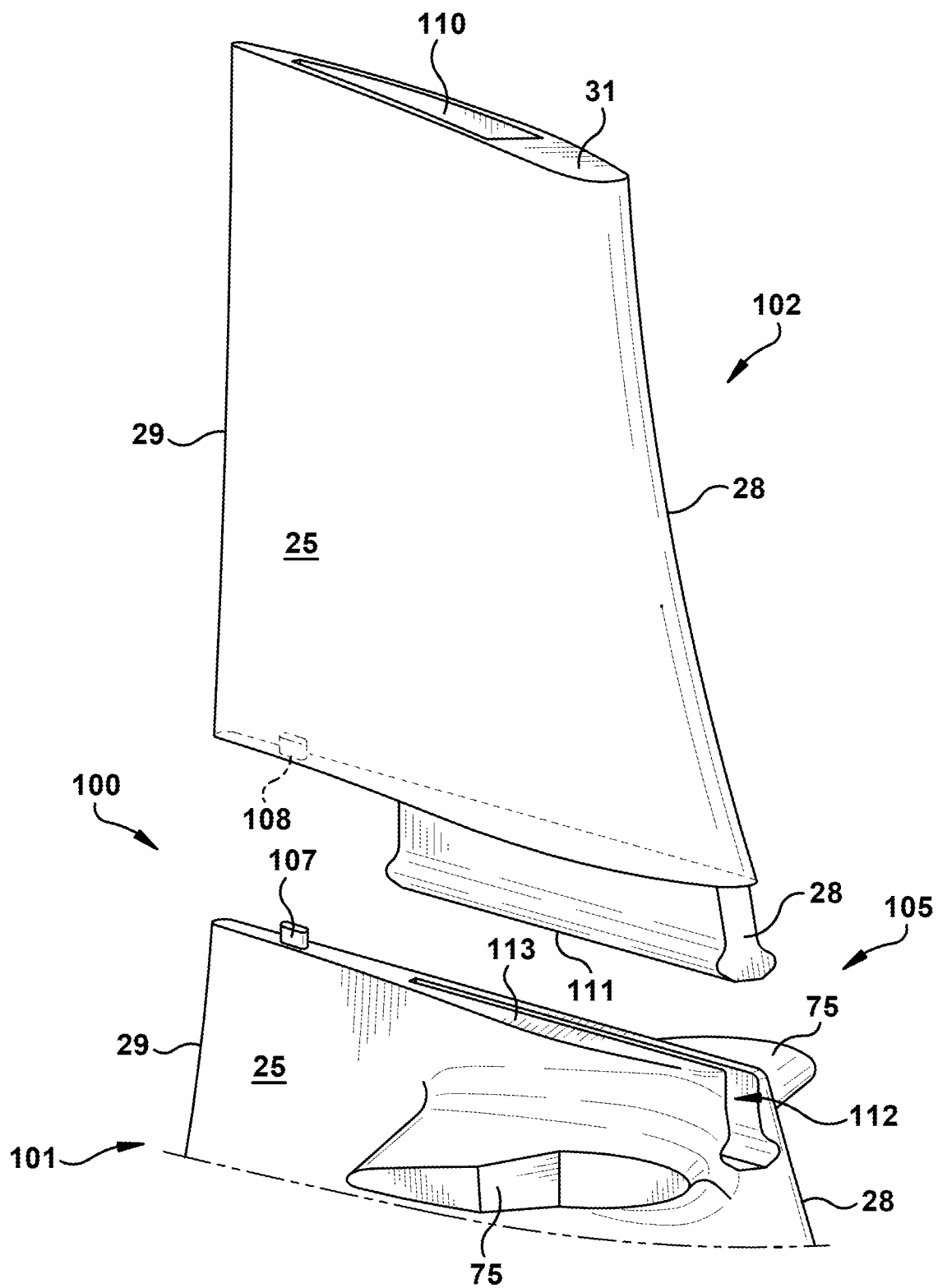
FIG. 9 is a disassembled perspective view of an exemplary rotor blade having a hybrid airfoil and dovetail connector according to possible aspects and embodiments of the present application.
Figure 10:
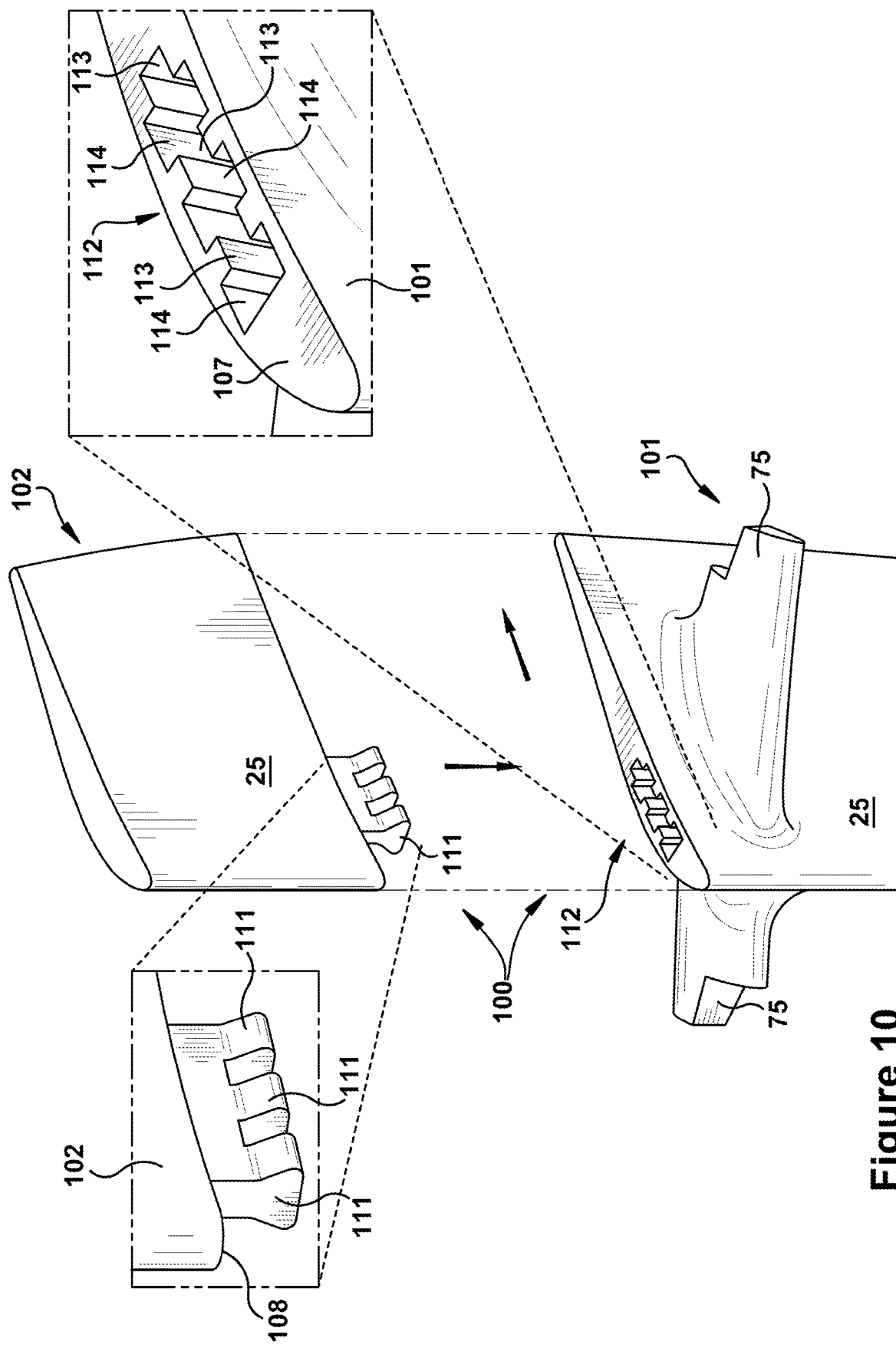
FIG. 10 is a perspective view of an exemplary rotor blade having a hybrid airfoil with dovetail connector embodiment demonstrating a method of assembly.
Figure 11:
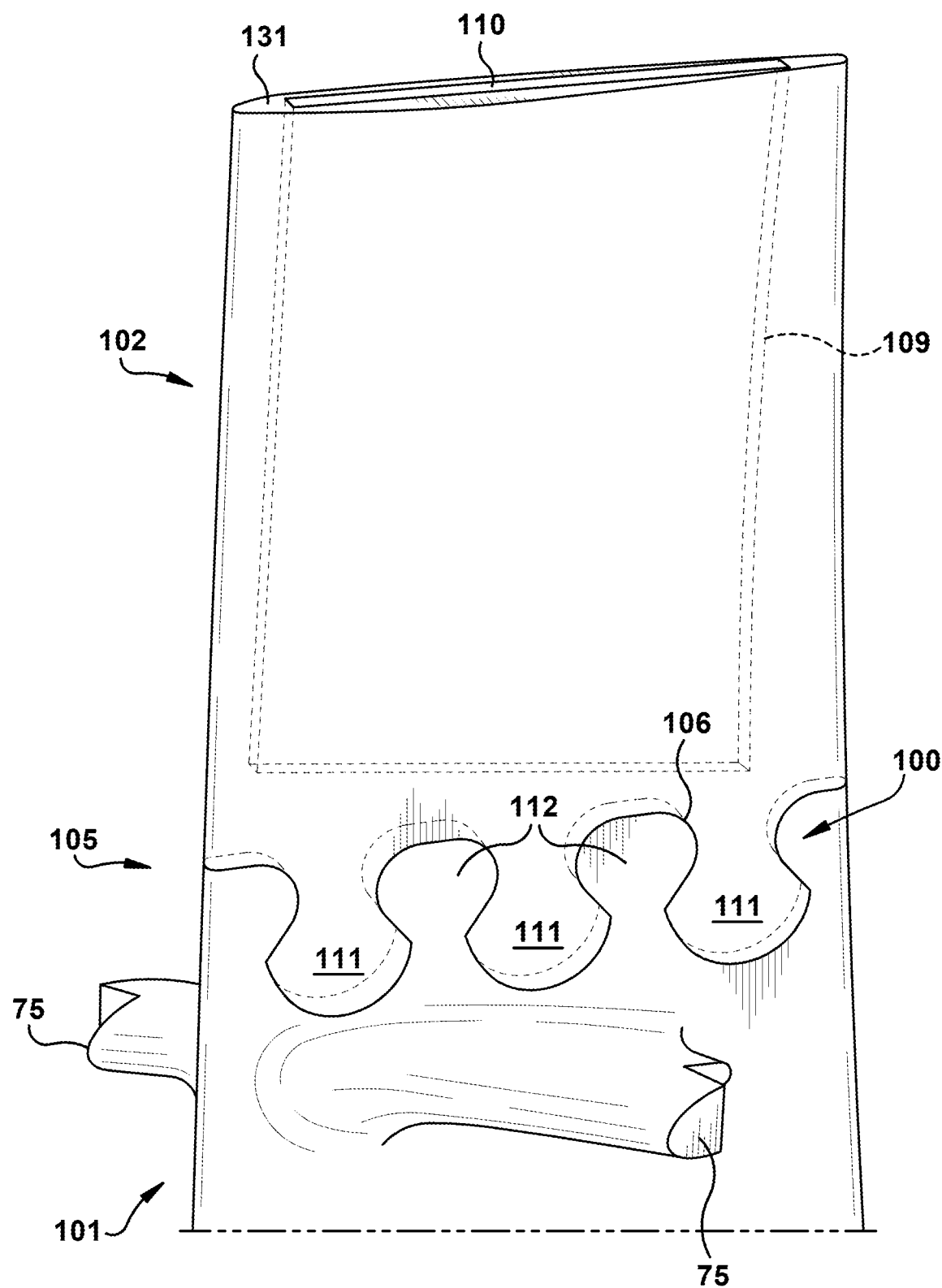
FIG. 11 is a perspective view of an exemplary rotor blade having a hybrid airfoil with dovetail connector according to possible aspects and embodiments of the present application.

With specific reference now to FIGS. 9 through 11, a connector 100 is shown that creates an interlocking fit between the non-integral portions of the airfoil 25, i.e., the base portion 101 and the top portion 102. In this case, the connector 100 is a dovetail joint 105, which secures the top portion 102 to the base portion 101 of the airfoil 25.

In accordance with the present disclosure, the dovetail joint 105 will be described as having complimentary interlocking features formed on opposing sides between the base portion 101 and the top portion 102, which, upon assembly, form a connection therebetween. A first feature of the dovetail joint 105 will be referred to herein as a "dovetail" 111. This terminology, however, is not meant to be limiting and, unless otherwise qualified, is intended to broadly refer to the male component of an interlocking connector or dovetail joint. The dovetail 111, thus, may be defined generally as a shaped projection extending from a surface that has a cross-sectional profile that flares or enlarges as it extends away from that surface (or, from another perspective, tapers or narrows as it approaches that surface). A second feature of the dovetail joint 105 will be referred to herein as a "dovetail groove" 112, which is the complementary feature configured to receive the dovetail 111 and, thereby, form the interlocking connection. Again, this terminology is not meant to be limiting and, unless otherwise qualified, it is intended to broadly refer to the female component of an interlocking connector or dovetail joint. Thus, the dovetail groove 111 may be defined a shaped groove formed within a surface that widens as it extends further into that surface (or, from another perspective, narrows as it nears that surface).

Accordingly, as used herein, the dovetail joint 105 is a connector having at least one such dovetail 111 received and retailed within at least one such complementary dovetail groove 112. As will be appreciated, the dovetail 111 and the dovetail groove 112 may be formed on opposite ones of the base portion 101 and the top portion 102 of the airfoil 25. For example, the dovetail 111 may be formed on the base portion 101 of the airfoil 25 or, as shown in the illustrated examples, the dovetail 111 may be formed on the top portion 102 of the airfoil 25. The dovetail groove 112 may be formed on the top portion 102 of the airfoil 25 or, as illustrated, the dovetail groove 112 may be formed on the base portion 101 of the airfoil 25.

For example, the dovetail 111 may have a cross-sectional shape that enlarges as it extends away from the surface on which it is formed, which may include either the outboard face 107 or the inboard face 108 of the base portion 101 or top portion 102, respectively. The dovetail groove 112 may have a cross-sectional shape that corresponds to that of the dovetail 111, which results in the dovetail groove 112 becoming narrower as it nears the surface into which it is formed, which may include either the outboard face 107 or the inboard face 108 of the base portion 101 or the top portion 102 of the airfoil 25, respectively. As used herein, the surface opening through which the dovetail groove 112 is formed may be referred to as a "mouth" 113. In accordance with the present disclosure, the dovetail joint 105 is configured such that engagement of the dovetail 111 within the dovetail groove 112 restricts the top portion 102 from radially separating from the base portion 101 of the airfoil 25. It has been found that, among several advantages, the interlocking dovetail joint 105 forms effective resistance against the tensional stresses that are applied to the airfoil 25 during operation.

As shown in the exemplary embodiments of FIGS. 9 and 10, the dovetail joint 105 of the present disclosure may be an axially engaged dovetail joint. As used herein, an axially engaged dovetail joint is one that is engaged via relative axial movement (relative to the axis of the gas turbine) between the top portion 102 and the base portion 101 of the airfoil 25. As illustrated, in accordance with preferred embodiments, the dovetail 111 may be positioned on the inboard face 108 of the top portion 102, and the dovetail groove 112 may extend into the base portion 101 from a mouth 113 defined on the outboard face 107 of the base portion 101. Given this arrangement, the dovetail 111 has a cross-sectional shape that remains substantially constant over its length, which is defined in the axial direction, while that profile is contoured so that it enlarges in the circumferential direction as the dovetail 111 extends away from the inboard face 108 of the top portion 102. The dovetail groove 112 has cross-sectional shape that corresponds to the shape of the dovetail 111. Thus, the dovetail groove 112 has a cross-sectional shape that remains substantially constant over its length, which is defined in the axial direction, while that profile is contoured so that it widens in the circumferential direction as the dovetail groove 112 extends further into the outboard face 107 of the base portion 101.

The dovetail 111 elongates between first and second ends, which, given the axial orientation of the dovetail 111, also may be referred to as forward and aftward ends. The positioning of these ends may vary. As shown in FIG. 9, in accordance with a preferred embodiment, the forward end of the dovetail 111 is positioned at the leading edge 28 of the airfoil 25. In such cases, the forward end of the dovetail 111 defines a radial section of the leading edge 28 of the airfoil 25 once the dovetail 111 is fully engaged within the dovetail groove 112. The length of the dovetail 111 may vary. In accordance with exemplary embodiment of FIG. 9, the length of the dovetail 111 is such that the aftward end of the dovetail 111 is positioned beyond an axial midline 32 of the airfoil 25.

As the illustrated embodiment of FIG. 10 shows, the dovetail 111 may elongate between forward and aftward ends that are offset from the leading edge 28 and trailing edge 29 of the airfoil 25, respectively. That is, the forward end is offset a distance from the leading edge 28 of the airfoil 25 and the aftward end is offset a distance from the trailing edge 29 of the airfoil 25. In such cases, an assembly opening 114 may be formed adjacent to the dovetail groove 112 for the purposes of connecting the dovetail joint 105. As will be appreciated, the assembly opening 114 is configured to accept the dovetail 111 so that, during installation, the dovetail 111 can be brought through the assembly opening 114 so to achieve a radial alignment with the dovetail groove 112. Once this alignment is achieved, the dovetail 111 can be then be slid into dovetail groove 112 via movement in an axial direction. As shown in FIG. 10, multiple dovetails 111 and dovetail grooves 112 pairings may be provided. In such cases, one of the assembly openings 114 is provided for each pair.

As shown in the exemplary embodiment of FIG. 11, the dovetail joint 105 of the present disclosure may be a circumferentially engaged dovetail joint. As used herein, a circumferentially engaged dovetail joint is one that is engaged via relative circumferential movement (relative to the axis of the gas turbine) between the top portion 102 and the base portion 101 of the airfoil 25. In this case, the dovetail joint 105 may include a plurality of the dovetails 111 extending from the top portion 102 and a plurality of the dovetail grooves 112 formed in the base portion 101. Each of the plurality of the dovetails 111 may be retained in a corresponding respective one of the plurality of the dovetail grooves 112. The several interlocking dovetail/dovetail groove pairings may be used to provide effective resistance against tensional stresses applied to the airfoil as well as enhancing stress spreading characteristics within the joint. Unless specifically stated otherwise, it will be appreciated that the number and placement of the interlocking dovetail/dovetail groove pairings, as well as the specific profile thereof, may depend upon design criteria associated with specific applications.

Figure 12:
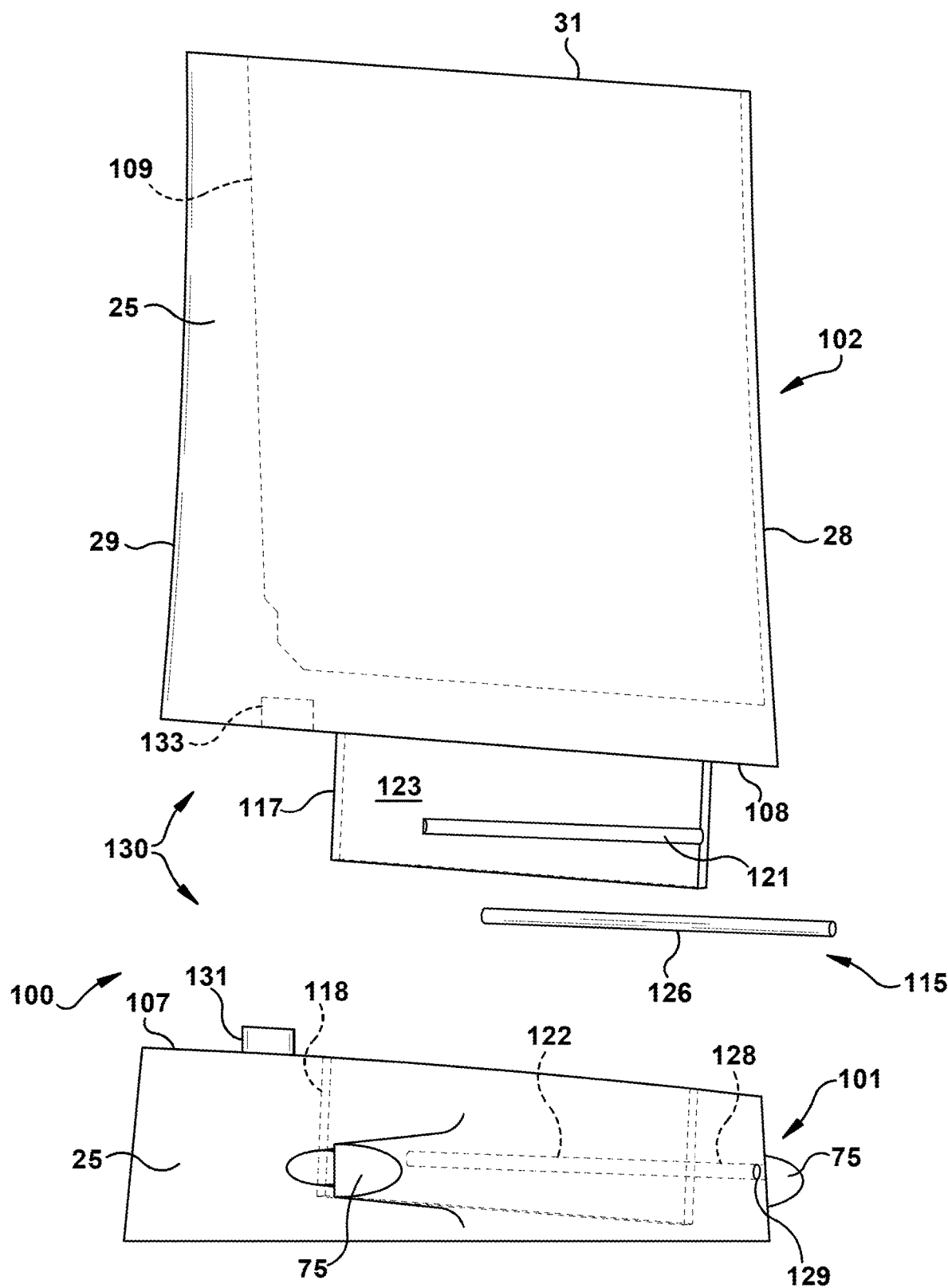
FIG. 12 is a disassembled side view of an exemplary rotor blade having a hybrid airfoil with wire-lock connector according to possible aspects and embodiments of the present application.
Figure 13:
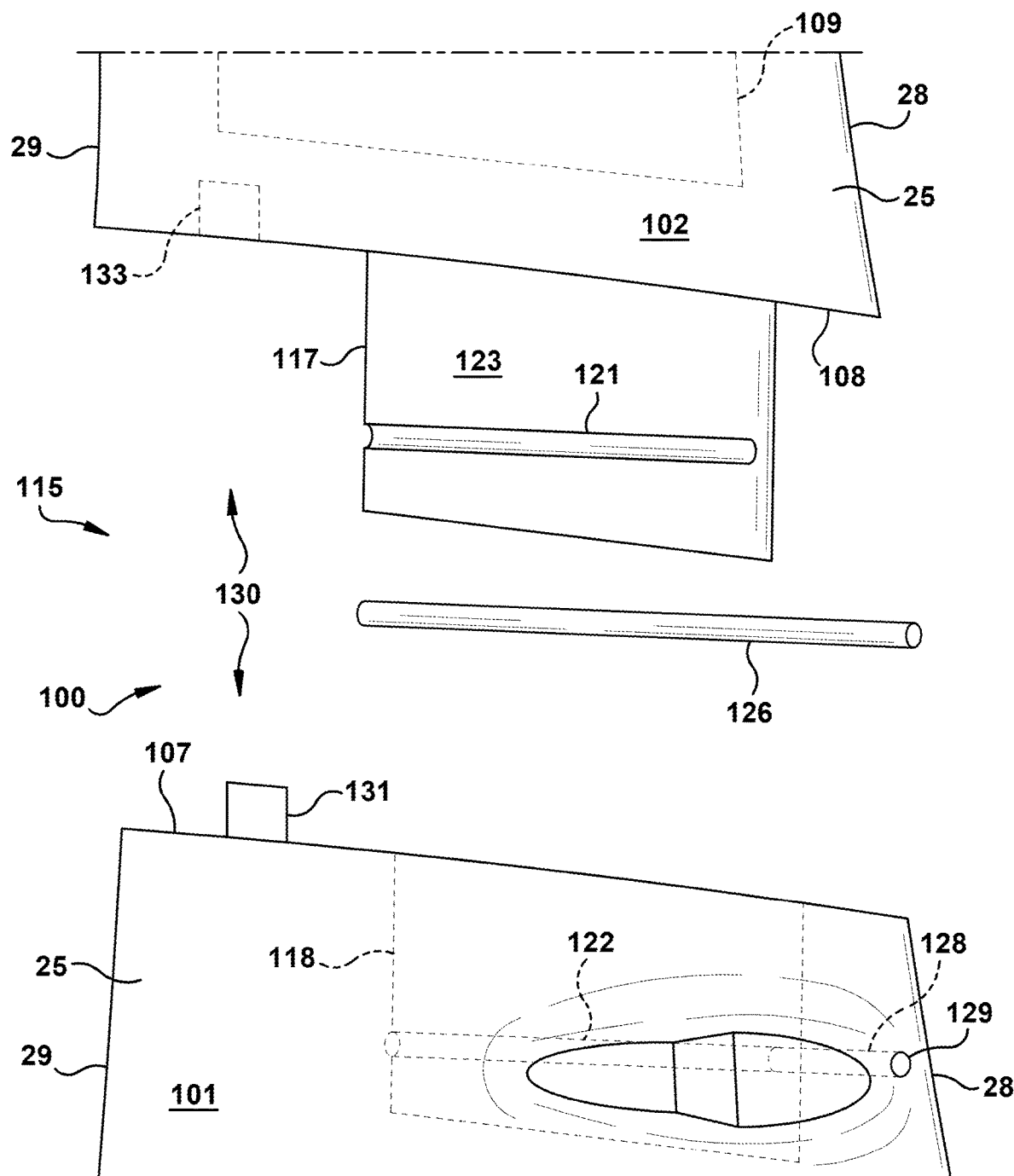
FIG. 13 is a disassembled side view of an exemplary rotor blade having a hybrid airfoil with wire-lock connector according to possible aspects and embodiments of the present application.
Figure 14:
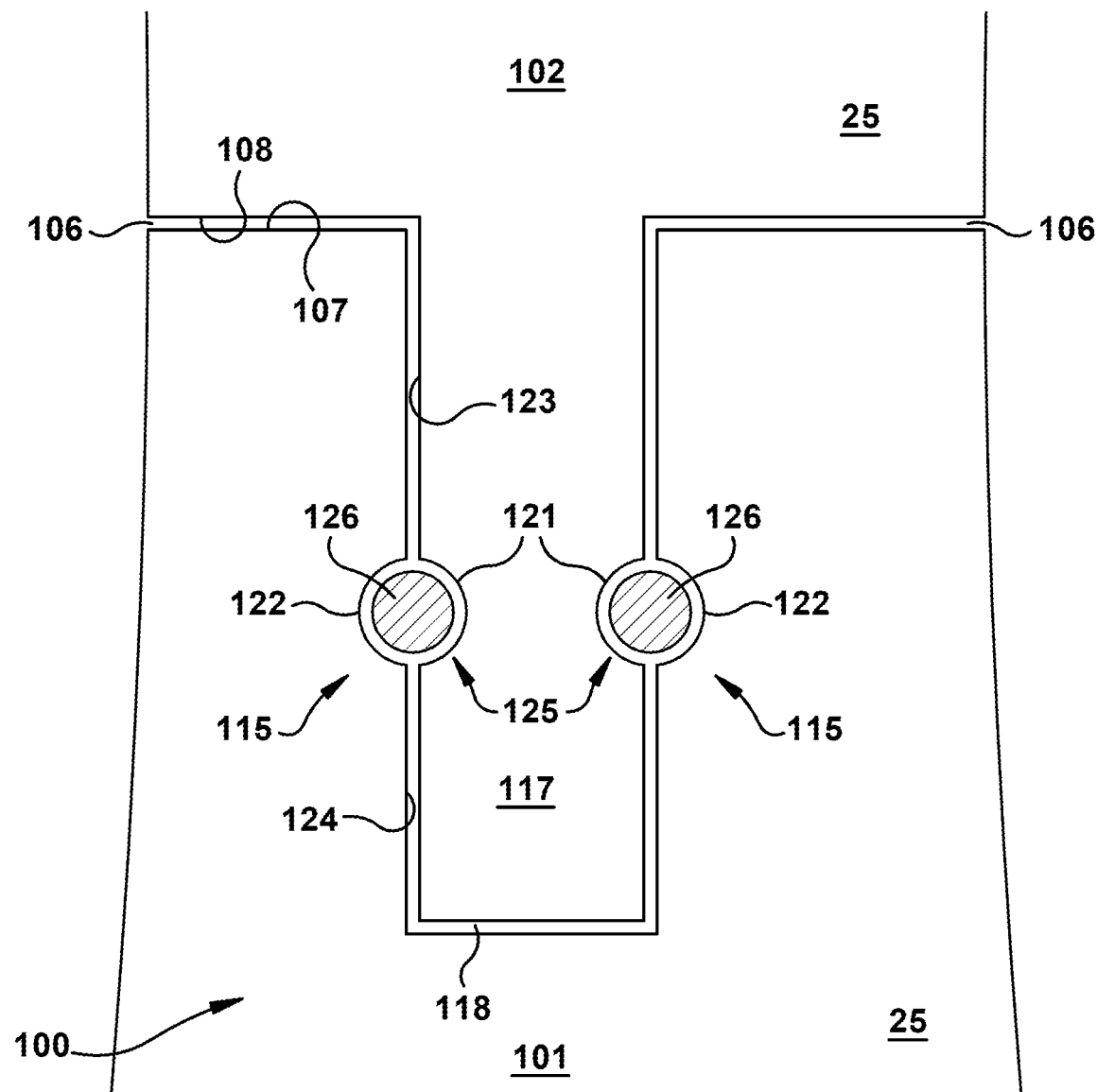
FIG. 14 is a cross-sectional front view of an exemplary rotor blade having a hybrid airfoil with wire-lock connector according to possible aspects and embodiments of the present application.

With specific reference to FIGS. 12 through 14, an alternative connector 100 for use with hybrid airfoils is shown. In this case, a "wire-lock connector" 115 is used to secure the top portion 102 to a base portion 101 of the airfoil 25, which may include any of the airfoils described above. In accordance with the present disclosure, the wire-lock connector 115 may include: a tab 117 extending from one of the base portion 101 and the top portion 102; a complimentary slot 118 for receiving the tab 117 formed in the other one of the base portion 101 and the top portion 102; a first groove 121 formed in a side 123 of the tab 117; a second groove 122 formed in a side 124 of the slot 118; a retaining aperture 125 (see FIG. 14), which is formed cooperatively via an alignment of the first groove 121 and second groove 122 once the tab 117 is received fully into the slot 118; and a retaining wire 126, which is housed within the retaining aperture 125 (as shown specifically in FIG. 14). Preferably the retaining wire 126 is sized so that it fills the first groove 121 and second groove 122 when it is installed within the retaining aperture 125. In this way, the retaining wire 126 creates a mechanical interference fit that restricts relative radial movement between the top portion 102 and the base portion 101 of the airfoil 25. Though other materials are possible, the retaining-wire 126 may be made from the same material as that of the base portion 101.

In accordance with exemplary embodiments, the wire-lock connector 115 may include an installation aperture 128. The installation aperture 128 may extend through the airfoil 25 from an opening 129 formed on the surface of the airfoil 25 to a position that aligns with one of the ends of the retaining aperture 125. As will be appreciated, the installation aperture 128 may be used for inserting the retaining wire 126 into the retaining aperture 125 once the tab 117 has been fully inserted into the slot 118 so to align the first and second grooves 121, 122. As will be appreciated, a continuation of the retaining wire 126 may remain in the installation aperture 128 once installation is complete.

In accordance with exemplary embodiments, the tab 117 may be positioned on the inboard face 108 of the top portion 102 of the airfoil 25. In such cases, as will be appreciated, the slot 118 will be formed on the base portion 101 of the airfoil 25, extending into the base portion 101 from a mouth or opening defined on the outboard face 107 of the base portion 101. The opposite placement of the tab 117 and slot 118 is also possible.

In accordance with exemplary embodiments, the tab 117 elongates in an approximate axial direction between a first end and a second end, which may also be referred to as a forward end and aftward end, respectively, due to their relative location. Preferably, the forward end of the tab 117 is positioned to a forward side of an axial midline of the airfoil 25, while the aftward end is positioned to an aftward side of the axial midline. As shown in the illustrated embodiments, the forward end of the tab 117 may be offset a distance from the leading edge 28 of the airfoil 25, and the aftward end of the tab 117 may be offset a distance from the trailing edge of the airfoil 25.

In accordance with exemplary embodiments, the retaining aperture 125 and retaining wire 126 housed therein may extend the full length of the tab 117 or, in an alternate embodiment, a portion of the length of the tab 117. Specifically, as shown in FIG. 13, the retaining aperture 125 and the retaining wire 126 housed therein may extend the full length of the tab 117. Optionally, as shown in the alternative of FIG. 12, the retaining aperture 125 and the retaining wire 126 housed therein may extend over only a portion of the length of the tab 117. For example, the retaining aperture 125 and the retaining wire 126 housed therein may extend from the forward end of the tab 117 to a position that is short of the aftward end of the tab 117. In such cases, the retaining aperture 125 and the retaining wire 126 housed therein preferably extend to a position defined within a range of between 40% and 80% of the axial length of the tab 117 (as measured from the forward end of the tab 117).

As shown in FIGS. 12 and 13, in accordance with an alternative embodiment, a supplemental connector 130 may be included with the wire-lock connector 115. For example, the supplemental connector 130 may include a radial pin 131 and radial aperture 133 that are configured to form a second connection between the top portion 102 and the base portion 101 of the airfoil 25. As illustrated, the radial pin 131 may extend radially from the outboard face 107 of the base portion 101, while a complementary radial aperture 133 is formed in the inboard face 108 of the top portion 102 for receiving the radial pin 131. In accordance with preferred embodiments, the supplemental connector 130 is located aft of the tab 117 and slot 118 of the wire-lock connector 115. In this way, the supplemental connector 130 may be used to resist the torsional loads applied to the airfoil 25 during operation.

While FIGS. 12 and 13 show only a single wire-lock connector 115, FIG. 14 illustrates an alternative embodiment in which a plurality of wire-lock connectors 115 are used. As illustrated, in this cases, a second wire-lock connector 115 is formed on the opposite side of the tab 117 from the first wire-lock connector 115. Other embodiments may include a second wire-lock connector 115 being formed on the same side of the tab 117 as the first wire-lock connector 115.

The features of the wire-lock connector 115 have been found to provide effective resistance against tensional stresses applied to the airfoil 25, while also being both efficiently constructed and repaired. For example, the retaining wire 126 is component that may be easily manufactured or otherwise inexpensively obtained because of its simple configuration. Further, the configuration of the wire-lock connector 115 allows arrangements that result in the retaining wire 126 accumulating much of the wear that occurs within the connector. Because the retaining wire 126 can be conveniently replaced as this wear accumulates, the life of the other, more costly components associated with the wire-lock connector 115 can be inexpensively extended, while still maintaining the robustness of the connection between the airfoil portions.

With specific reference now to FIGS. 15 through 18, embodiments are disclosed in which a pin connector 145 is used to secure the top portion 102 to the base portion 101 of a hybrid airfoil 25, which may include any of the airfoils already described above.

In accordance with exemplary embodiments, the pin connector 145 may include: a tab 147 extending from one of the base portion 101 and the top portion 102; a complimentary slot 148 for receiving the tab 147 (where the slot 148 is formed in the other one of the base portion 101 and the top portion 102); an elongated pin cavity 150 formed through an interior region of the airfoil 25 that is adjacent to the slot 148 (where the pin cavity 150 intersects the slot 148 so that the pin cavity 150 is divided into first and second pin cavity segments that extend away from the slot 148 from first and second openings defined on opposing first and second sidewalls of the slot 148, respectively); a tab aperture 151 formed through the tab 147 (where the tab aperture 151 is positioned so to align with the pin cavity 150 upon the tab 147 being received within the slot 148); and a locking pin 152 that extends continuously through the first segment of the pin cavity 150, the tab aperture 151, and the second segment of the pin cavity 150. As will be appreciated, given this arrangement, the locking pin 152, once engaged, restricts relative radial movement between the top portion 102 and the base portion 101 of the airfoil 25 via the contact it makes with the surrounding structure (i.e., the structure forming the pin cavity 150 and the tab aperture 151).

Figure 15:
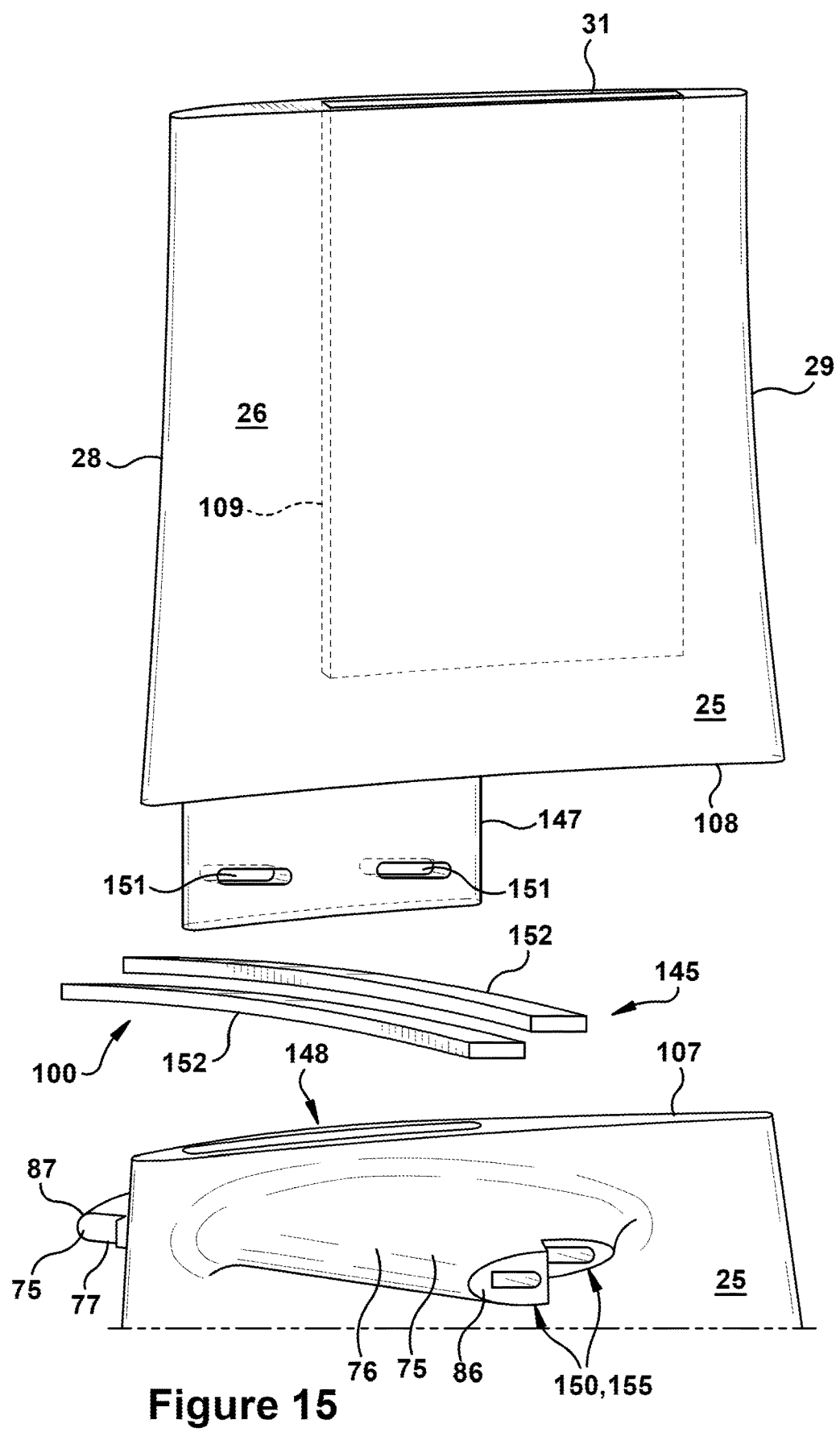
FIG. 15 is a disassembled perspective view of an exemplary rotor blade having a hybrid airfoil with pin connector according to possible aspects and embodiments of the present application.
Figure 16:
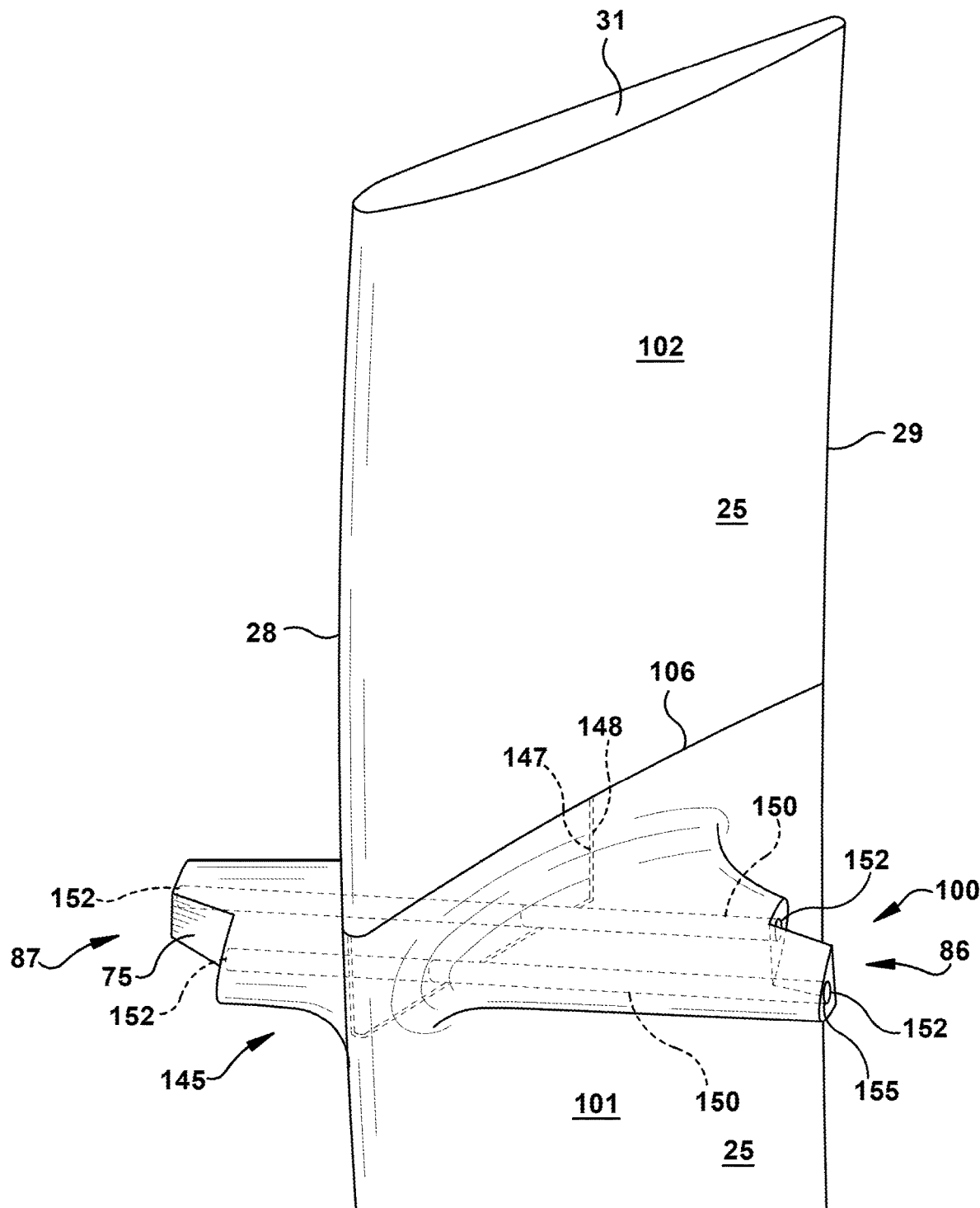
FIG. 16 is an assembled transparent view of an exemplary rotor blade having a hybrid airfoil with pin connector according to possible aspects and embodiments of the present application.
Figure 17:
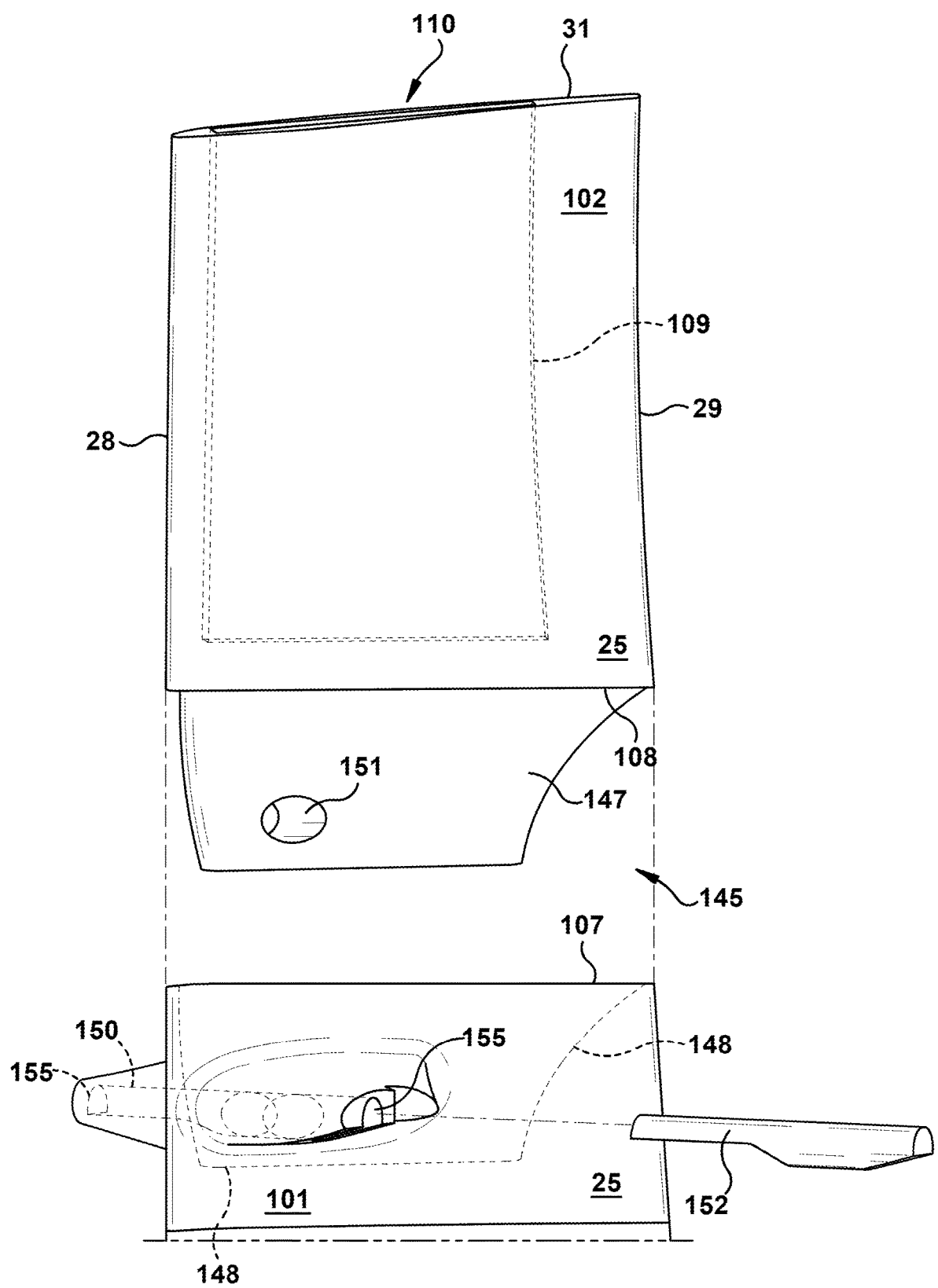
FIG. 17 is a disassembled perspective view of an exemplary rotor blade having a hybrid airfoil with pin connector according to possible aspects and embodiments of the present application.

The pin connector 145 may be formed with a single locking pin 152, as shown in the example of FIG. 17, or the pin connector 145 may include two locking pins 152, as shown in the examples of FIGS. 15 and 16. In the latter case, as illustrated, the pin connector 145 may include two pin cavities 150 and two respective locking pins 152, while having a single tab 147 through which two of the tab apertures 151 are formed. A second pin cavity 150 may be axially offset from a first pin cavity 150, and a second tab aperture 151 may be axially offset from a first tab aperture 151. As will be appreciated, upon insertion of the tab 147 into the slot 148, the first tab aperture 151 is positioned on the tab 147 so that it aligns with the first pin cavity 150, while the second tab aperture 151 is positioned on the tab 147 so that it aligns with the second pin cavity 150. First and second locking pins 152 then may engage the first and second pin cavities 150 and the first and second tab apertures 151, respectively. Though other materials are possible, the one or more locking pins 152 may be made from the same material as that of the base portion 101 of the airfoil 25.

In accordance with the present disclosure, as shown in FIGS. 15-17, preferred embodiments of the pin connector 145 may include the tab 147 being positioned on the inboard face 108 of the top portion 102. In such cases, the pin cavity 150 is formed through an interior region of the base portion 101 of the airfoil 25, and the slot 148 is formed in the base portion 101 (i.e., with the slot 148 extending into the base portion 101 from a mouth defined on the outboard face 107 of the base portion 101). As shown, exemplary embodiments may include the tab 147 being oriented so that it elongates in an approximate axial direction. Thus, the tab 147 may have first and second ends, where the first end has a forward position relative to the second end.

The airfoil 25 may include a part-span shroud 75 positioned just inboard of the interface line 106. As will be seen, in accordance with the present disclosure, exemplary embodiments may include advantageously incorporating the locking pin 152 and pin cavity 150 with aspects of the part-span shroud 75. As described above, the part-span shroud 75 may include a pressure wing 76 extending from the pressure face of the airfoil 25 and a suction wing 77 extending from the suction face of the airfoil 25. Further, a distal end of the pressure wing 76 may include a pressure wing circumferential face 86, and a distal end of the suction wing 77 may include a suction wing circumferential face 87. In accordance with exemplary embodiments, at least a portion of the pin cavity 150 is defined within one of the pressure wing 76 and the suction wing 77 of the part-span shroud 75. More specifically, the first segment of the pin cavity 150 may extend between a first surface opening 155 and the first opening defined on the first sidewall of the slot 148. In preferred embodiments, the first surface opening 155 is formed either on the pressure wing circumferential face 86 or the suction wing circumferential face 87 of the part-span shroud 75.

Alternative embodiments may include the locking pin 152 and pin cavity 150 extending through both of the wings 76, 77 of the part-span shroud 75. That is, the first segment of the pin cavity 150 may extend between a first surface opening 155 and the first opening defined on the first sidewall of the slot 148, and the second segment of the pin cavity 150 may extend between a second surface opening 155 and the second opening defined on the second sidewall of the slot 148. In such cases, the first surface opening 155 and the second surface opening 155 may be formed on the pressure wing circumferential face 86 and the suction wing circumferential face 87 of the part-span shroud 75, respectively. As will be appreciated, this results in the incorporation of the locking pin 152 and pin cavity 150 into both of the wings 76, 77 of the part-span shroud 75. In such cases, the ends of the locking pin 152 may be positioned at or near the surface openings 155 of the pin cavity 150. Specifically, the locking pin 152 may be described as elongating between first and second ends, wherein the first end resides in proximity to the first surface opening 155, and the second end resides in proximity to the opposing second surface opening 155.

Figure 18:
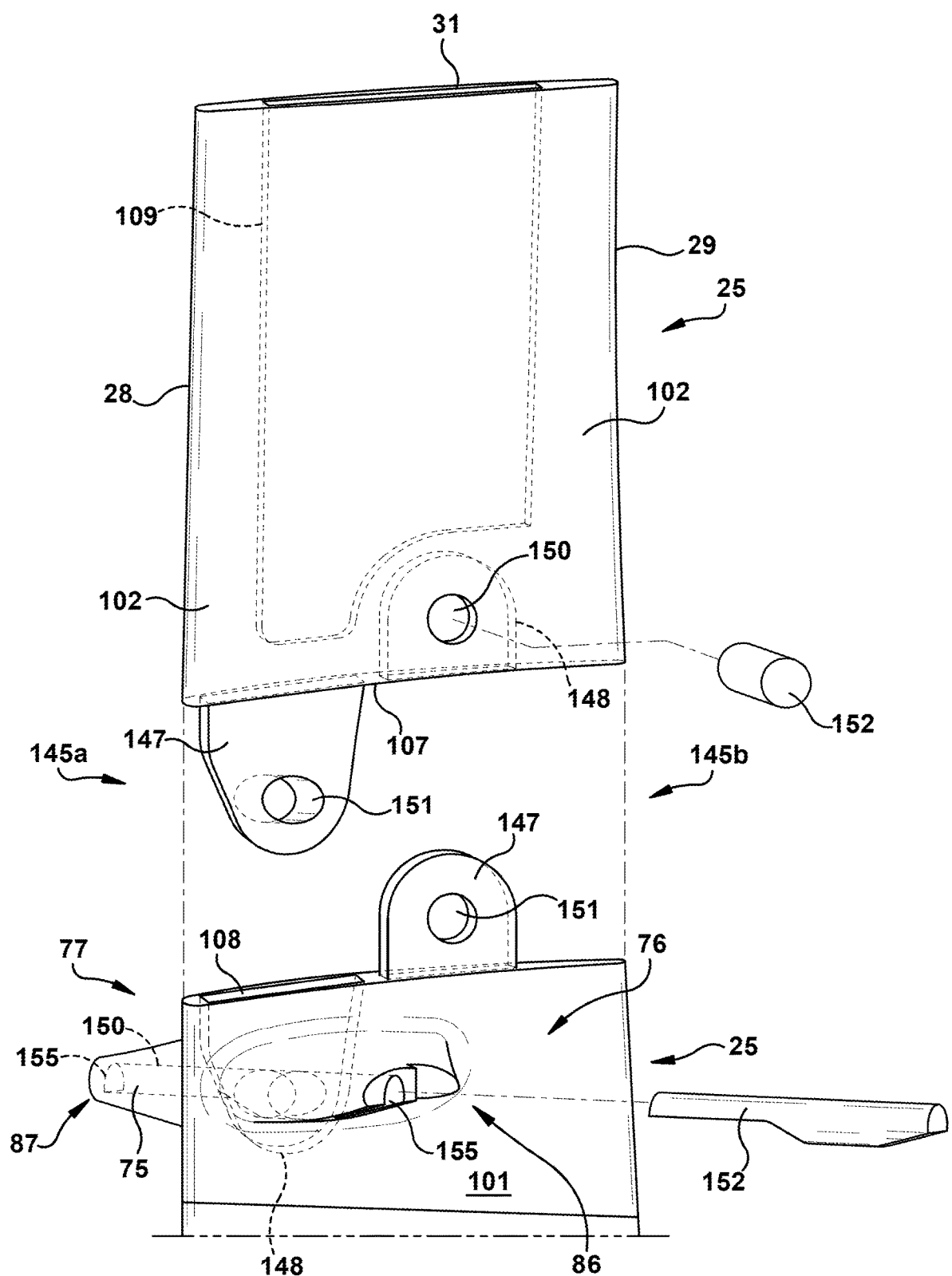
FIG. 18 is a perspective view of an exemplary rotor blade having a hybrid airfoil with pin connector according to possible aspects and embodiments of the present application.

In accordance with the present disclosure, exemplary embodiments may include the locking pin 152 having a variable cross-sectional shape that tapers toward the first and second ends from a thicker middle portion. This shape may be effectively incorporated into the part-span shroud 75, as shown in the examples of FIGS. 17 and 18, because, typically, the pressure wing 76 and suction wing 77 together form a similar shape given how each tapers from a thicker region as it extends away from the airfoil 25. Thus, the locking pin 152 may be shaped to correspond with the variable cross-sectional shape of the pressure and suction wings 76, 77 of the part-span shroud 75, giving the locking pin 152 a thicker and—advantageous for the pin connector—stronger middle portion. The pin cavity 150 may be configured to have a variable cross-sectional shape that at least partly corresponds to the variable cross-sectional shape of the locking pin 152. In a preferred embodiment, the variable cross-sectional shape of the pin cavity 150 narrows sufficiently at one end to create a mechanical stop that aids in assembling the locking pin 152, i.e., the mechanical stop prevents further insertions of the locking pin 152 once the locking pin 152 has attained a fully installed position within the pin cavity 150.

As shown in FIG. 18, exemplary embodiments may include the connector having two separate pin connectors 145. In accordance with a preferred embodiment, the two pin connectors 145 are axially stacked. Further, exemplary embodiments may include tabs 147 being formed on both the base and top portions 101, 102 of the airfoil 25. Thus, a first pin connector 145*a* may include a tab 147 positioned on the inboard face 108 of the top portion 102 and an opposing slot 148 formed through the outboard face 107 of the base portion 101, while the second pin connector 145*b* includes a tab 147 positioned on the outboard face 107 of the base portion 101 and an opposing slot 148 formed through the inboard face 108 of the top portion 102.

As with the other connectors discussed above, the features of the pin connector 145 have similarly been found to provide effective resistance against tensional stresses applied to the airfoil 25, while also being efficiently constructed and repaired. Further, in the same way as described in relation to the retaining wire 126, the locking pin 152 of the pin connector 145 is a component that may be conveniently replaced as wear accumulates so to extend useful life of the connector.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations are not provided or discussed in detail, though all combinations and possible embodiments embraced by the several claims below or otherwise are intended to be part of the present application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A rotor blade for use in a turbine of a turbine engine, the rotor blade comprising:
    an airfoil that extends from a connection with a root to an outboard tip, the airfoil comprising non-integral portions in which:
        a base portion comprises a first material; and
        a top portion comprises a second material;
    a connector securing to the base portion to the top portion of the airfoil, wherein the connector comprises a first pin connector;
        a tab extending from one of the base portion and the top portion;
        a complimentary slot for receiving the tab, the slot being formed in the other one of the base portion and the top portion;
        an elongated pin cavity formed through an interior region of the airfoil adjacent to the slot, wherein the pin cavity intersects the slot so that the pin cavity is divided into first and second pin cavity segments extend away from the slot from first and second openings defined on opposing first and second sidewalls of the slot, respectively;

a tab aperture formed through the tab, the tab aperture positioned so align with the pin cavity upon the tab being received within the slot; and a locking pin that extends continuously through the first segment of the pin cavity, the tab aperture, and the second segment of the pin cavity.

2. The rotor blade according to claim 1, wherein the locking pin is configured to restrict relative radial movement between the top portion and the bottom portion of the airfoil via contact with structure forming the pin cavity and the tab aperture.

3. The rotor blade according to claim 1, wherein the top portion and base portion each comprises a radially defined section of the airfoil that join along an interface line defined on a surface of the airfoil;

wherein:

the base portion of the airfoil comprises an outboard face, the base portion of the airfoil extending between the connection with the root and the outboard face; and the top portion of the airfoil comprises an inboard face, the top portion extending between the outboard tip and the inboard face;

wherein a periphery of the outboard face of the base portion and a periphery of the inboard face of the top portion abut to form the interface line.

4. The rotor blade according to claim 3, wherein a radial height of the top portion is between 25% and 55% of a radial height of the airfoil; and wherein the first material of the base portion is heavier than the second material of the top portion.

5. The rotor blade according to claim 3, wherein the airfoil is defined between a pressure face and a laterally opposed suction face, wherein the pressure face and the suction face extend axially between opposite leading and trailing edges and radially between the outboard tip and the connection with the root.

6. The rotor blade according to claim 5, wherein the first material of the base portion comprises a nickel alloy; and wherein the second material of the top portion comprises a ceramic matrix composite.

7. The rotor blade according to claim 5, wherein the top portion comprises a hollow pocket extending into the top portion from an opening formed through the outboard tip of the airfoil;

wherein the hollow pocket comprises a volume greater than ¼ of a volume of the top portion of the airfoil.

8. The rotor blade according to claim 5, wherein the tab is positioned on the inboard face of the top portion;

wherein the pin cavity is formed through an interior region of the base portion of the airfoil;

wherein the slot extends into the base portion from a mouth defined on the outboard face of the base portion; and wherein the tab elongates in an approximate axial direction between a first end and a second end, the first end comprising a forward position relative to the second end.

9. The rotor blade according to claim 8, wherein the tab aperture, the pin cavity, and the locking pin of the first pin connector comprises a first tab aperture, a first pin cavity, and a first locking pin; and wherein the first pin connector comprises:

a second pin cavity axially offset from the first pin cavity;

a second tab aperture formed in the tab so that the second tab aperture aligns with the second pin cavity; and a second locking pin engaging the second pin cavity and the second tab aperture.

10. The rotor blade according to claim 8, wherein the airfoil comprises a part-span shroud positioned just inboard of the interface line, the part-span shroud comprising:

a pressure wing extending from the pressure face of the airfoil; and a suction wing extending from the suction face of the airfoil;

wherein a portion of the pin cavity is defined within one of: the pressure wing of the part-span shroud; and the suction wing of the part-span shroud.

11. The rotor blade according to claim 10, wherein a distal end of the pressure wing comprises a pressure wing circumferential face, and a distal end of the suction wing comprises a suction wing circumferential face;

wherein:

the first segment of the pin cavity extends between a first surface opening and the first opening defined on the first sidewall of the slot; and the first surface opening is formed on one of: the pressure wing circumferential face of the part-span shroud; and the suction wing circumferential face of the part-span shroud.

12. The rotor blade according to claim 10, wherein a distal end of the pressure wing comprises a pressure wing circumferential face, and a distal end of the suction wing comprises a suction wing circumferential face;

wherein:

the first segment of the pin cavity extends between a first surface opening and the first opening defined on the first sidewall of the slot; and the second segment of the pin cavity extends between a second surface opening and the second opening defined on the second sidewall of the slot;

wherein:

the first surface opening is formed on the pressure wing circumferential face of the part-span shroud; and the second surface opening is formed on the suction wing circumferential face of the part-span shroud.

13. The rotor blade according to claim 12, wherein the locking pin elongates between a first and second end;

wherein;

the first end resides in proximity to the first surface opening; and the second end resides in proximity to the second surface opening.

14. The rotor blade according to claim 13, wherein the locking pin comprises a variable cross-sectional shape that tapers toward the first and second ends from a thicker middle portion.

15. The rotor blade according to claim 13, wherein the pressure wing and suction wing of the part-span shroud each comprises variable cross-sectional shape that tapers as each extends away from the airfoil;

wherein the locking pin comprises a variable cross-sectional shape that corresponds to the variable cross-sectional shape of the pressure and suction wings of the part-span shroud; and wherein the pin cavity comprises a variable cross-sectional shape that corresponds to the variable cross-sectional shape of the locking pin, the pin cavity narrowing sufficiently to create a mechanical stop once the locking pin has attained an installed position within the pin cavity.

16. The rotor blade according to claim 8, wherein the tab aperture, the pin cavity, and the locking pin of the first pin connector comprises a first tab aperture, a first pin cavity, and a first locking pin;
wherein the connector further comprises a second pin connector that comprises:
a second tab positioned on the outboard face of the base portion;
a second slot extending into the top portion from a mouth defined on the inboard face of the top portion;
a second tab aperture formed through the second tab;
a second pin cavity formed through an interior region of the top portion of the airfoil; and
a second locking pin engaged within the second pin cavity and the second tab aperture.

17. The rotor blade according to claim 16, wherein the first and second pin connectors are axially stacked between the leading and trailing edges of the airfoil.

18. A gas turbine comprising a rotor blade that includes an airfoil that is defined between a pressure face and a laterally opposed suction face, the pressure face and the suction face extending axially between opposite leading and trailing edges and radially between an outboard tip and a connection with a root of the rotor blade;
wherein the airfoil comprises non-integral portions in which:
a base portion comprises a first material; and
a top portion comprises a second material;
a connector securing to the base portion to the top portion of the airfoil, wherein the connector comprises a first pin connector;
a tab extending from one of the base portion and the top portion;
a complimentary slot for receiving the tab, the slot being formed in the other one of the base portion and the top portion;
an elongated pin cavity formed through an interior region of the airfoil adjacent to the slot, wherein the pin cavity intersects the slot so that the pin cavity is divided into first and second pin cavity segments extend away from the slot from first and second openings defined on opposing first and second sidewalls of the slot, respectively;
a tab aperture formed through the tab, the tab aperture positioned so align with the pin cavity upon the tab being received within the slot; and
a locking pin that extends continuously through the first segment of the pin cavity, the tab aperture, and the second segment of the pin cavity.

19. The gas turbine according to claim 18, wherein the top portion and base portion each comprises a radially defined section of the airfoil that join on a surface of the airfoil along an interface line;
wherein:
the base portion of the airfoil comprises an outboard face, the base portion of the airfoil extending between the connection with the root and the outboard face; and
the top portion of the airfoil comprises an inboard face, the top portion extending between the outboard tip and the inboard face;
wherein a periphery of the outboard face of the base portion and a periphery of the inboard face of the top portion abut to form the interface line; and
wherein the airfoil comprises a part-span shroud positioned just inboard of the interface line;
wherein a portion of the pin cavity is defined within the part-span shroud.

20. The gas turbine according to claim 18, wherein the locking pin is configured to restrict relative radial movement between the top portion and the bottom portion of the airfoil via contact with structure forming the pin cavity and the tab aperture; and
wherein:
the tab elongates in an approximate axial direction between a forward and aftward end;
the locking pin elongates in an approximate circumferential direction.

* * * * *